US012801858B2

(12) United States Patent
Galvin et al.

(10) Patent No.: US 12,801,858 B2
(45) Date of Patent: Nov. 17, 2026

(54) CURATION AND MEMORY-COMPRESSION CONTROLLER FOR COGNITIVE FABRICS

(71) Applicant: AtomBeam Technologies Inc., Moraga, CA (US)

(72) Inventors: Brian Galvin, Silverdale, WA (US); Alexandria Tucker, Urbana, IL (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/534,654

(22) Filed: Feb. 9, 2026

(65) Prior Publication Data

US 2026/0203517 A1 Jul. 16, 2026

Related U.S. Application Data

(63) Continuation-in-part of application No. 19/451,374, filed on Jan. 16, 2026, and a continuation-in-part of (Continued)

(51) Int. Cl.

| | |
|---|---|
| ***G06F 40/30*** | (2020.01) |
| ***G06F 16/332*** | (2019.01) |
| ***G06F 16/3329*** | (2025.01) |

(52) U.S. Cl.
CPC .......... *G06F 40/30* (2020.01); *G06F 16/3325* (2019.01); *G06F 16/3329* (2019.01)

(58) Field of Classification Search
CPC .. G06F 40/30; G06F 16/3329; G06F 16/3325; G06F 16/353; G06F 16/3347;
(Continued)

(56) References Cited

U.S. PATENT DOCUMENTS

| | | | |
|---|---|---|---|
| 6,728,413 | B2 | 4/2004 | Onno |
| 12,223,456 | B1 | 2/2025 | Manohar et al. |

(Continued)

OTHER PUBLICATIONS

Vassilis et al. (Lexical Manifold Reconfiguration in Large Language Models: A Novel Architectural Approach for Contextual Modulation); arXiv:2502.08818v1 [cs.CL] Feb. 12, 2025. (Year: 2025).*

(Continued)

*Primary Examiner* — Abdelali Serrou
(74) *Attorney, Agent, or Firm* — GALVIN PATENT LAW LLC; Brian R. Galvin; Erin L. Johnston

(57) ABSTRACT

A system and method for compressing and curating memory structures in a cognitive computing system. The system maintains a memory manifold that represents memories as geometric objects with a metric defining their relationships. Memory structures are evaluated using a curation functional that combines semantic utility, geometric complexity, and additional factors such as usage frequency or storage cost. A compression flow transforms memory structures by following the gradient of this functional to reduce redundancy and complexity while preserving meaning. Additional compression operations may include entropy reduction of memory bundles, pruning of geometrically unstable regions, projection between spaces of different dimensions, or evolution of the metric itself based on usage patterns. Compressed structures are validated against identity constraints maintained in a separate cognitive hierarchy before being returned to memory for future retrieval. The approach enables efficient long-term memory management in persistent cognitive architectures.

27 Claims, 11 Drawing Sheets

Related U.S. Application Data application No. 19/397,858, filed on Nov. 21, 2025, said application No. 19/451,374 is a continuation-in-part of application No. 19/382,207, filed on Nov. 6, 2025, said application No. 19/397,858 is a continuation-in-part of application No. 19/328,094, filed on Sep. 12, 2025, now Pat. No. 12,632,663, which is a continuation-in-part of application No. 19/321,173, filed on Sep. 6, 2025, now Pat. No. 12,602,549, which is a continuation-in-part of application No. 19/284,115, filed on Jul. 29, 2025, said application No. 19/382,207 is a continuation of application No. 19/203,069, filed on Jun. 3, 2025, now Pat. No. 12,481,688, which is a continuation-in-part of application No. 19/205,960, filed on May 12, 2025, which is a continuation-in-part of application No. 19/060,794, filed on Feb. 24, 2025, said application No. 19/284,115 is a continuation of application No. 19/051,193, filed on Feb. 12, 2025, now Pat. No. 12,387,050, said application No. 19/060,794 is a continuation-in-part of application No. 19/044,546, filed on Feb. 3, 2025, which is a continuation-in-part of application No. 19/026,276, filed on Jan. 16, 2025, which is a continuation-in-part of application No. 18/928,022, filed on Oct. 26, 2024, which is a continuation-in-part of application No. 18/919,417, filed on Oct. 17, 2024, now Pat. No. 12,602,586, which is a continuation-in-part of application No. 18/918,077, filed on Oct. 17, 2024, which is a continuation-in-part of application No. 18/737,906, filed on Jun. 7, 2024, and a continuation-in-part of application No. 18/736,498, filed on Jun. 6, 2024.

(60) Provisional application No. 63/900,388, filed on Oct. 16, 2025, provisional application No. 63/868,329, filed on Aug. 21, 2025, provisional application No. 63/847,082, filed on Jul. 19, 2025, provisional application No. 63/847,096, filed on Jul. 19, 2025, provisional application No. 63/847,091, filed on Jul. 19, 2025, provisional application No. 63/847,101, filed on Jul. 19, 2025, provisional application No. 63/651,359, filed on May 23, 2024.

(58) Field of Classification Search

CPC ................. G06F 16/9024; G06F 18/22; G06F 18/21375; G06F 11/1446; G06F 40/40; G06F 40/284; G06F 40/166; G06F 40/279; G06F 40/20; G06F 40/35; G06F 40/56; G06F 16/2423; G06F 16/9532; G06F 16/957; G06F 40/197; G06F 40/205; G06F 8/33; G06F 9/547; G06F 16/90332; G06F 16/953; G06F 40/186; G06F 9/542; G06F 16/2237; G06F 16/243; G06F 16/24522; G06F 16/24539; G06F 16/25; G06F 16/252; G06F 16/3322; G06F 16/3344; G06F 16/338; G06F 16/383; G06F 16/432; G06F 16/438; G06F 16/8358; G06F 16/90328; G06F 16/9038; G06F 16/906; G06F 16/9535; G06F 16/9538; G06F 16/955; G06F 18/2413; G06F 21/53; G06F 21/552; G06F 21/554; G06F 21/566; G06F 2221/033; G06F 30/13; G06F 40/103; G06F 40/117; G06F 40/194; G06F 40/237; G06F 40/242; G06F 40/258; G06F 40/268; G06F 40/274; G06F 40/289; G06F 40/295; G06F 40/47; G06F 40/58; G06F 9/453; G06F 9/45504; G06F 9/546; G06F 16/345; G06F 16/367; G06F 16/68; G06F 16/93; G06F 18/00; G06F 21/16; G06F 21/84; G06F 40/211; G06F 40/216; G06F 40/44; G06F 8/34; G06F 9/541; G10L 15/063; G10L 15/22; G10L 15/16; G10L 15/1815; G10L 15/26; G10L 2015/223; G10L 25/30; G10L 15/18; G10L 15/183; G10L 15/30; G10L 2015/0631; G10L 2015/0638; G10L 2015/088; G10L 2015/221; G10L 25/48; G10L 15/02; G10L 25/63

See application file for complete search history.

(56) References Cited

U.S. PATENT DOCUMENTS

| | | | | |
|---|---|---|---|---|
| 2002/0091801 | A1 | 7/2002 | Lewin et al. | |
| 2004/0083195 | A1 | 4/2004 | McCord et al. | |
| 2008/0042401 | A1* | 2/2008 | Walker | A63C 9/02 280/615 |
| 2009/0235099 | A1 | 9/2009 | Branover et al. | |
| 2019/0174514 | A1 | 6/2019 | Ramesh et al. | |
| 2020/0336562 | A1 | 10/2020 | Luft | |
| 2020/0351344 | A1 | 11/2020 | Das Gupta et al. | |
| 2021/0073808 | A1 | 3/2021 | Gu et al. | |
| 2021/0406224 | A1 | 12/2021 | Neufeld et al. | |
| 2022/0138156 | A1 | 5/2022 | Wang et al. | |
| 2023/0316006 | A1 | 10/2023 | Tunstall-Pedoe et al. | |
| 2023/0360370 | A1* | 11/2023 | Yu | G06N 3/084 |
| 2024/0104391 | A1 | 3/2024 | Higgins et al. | |
| 2024/0160955 | A1 | 5/2024 | Zhao et al. | |
| 2024/0289395 | A1 | 8/2024 | Zhou et al. | |
| 2024/0354320 | A1 | 10/2024 | Procter et al. | |
| 2024/0386015 | A1 | 11/2024 | Crabtree et al. | |
| 2024/0411809 | A1 | 12/2024 | Najafirad et al. | |
| 2024/0428008 | A1 | 12/2024 | Abraham et al. | |
| 2025/0021761 | A1 | 1/2025 | Santhanam et al. | |
| 2025/0028882 | A1 | 1/2025 | Ataei et al. | |
| 2025/0085894 | A1 | 3/2025 | Lee et al. | |
| 2025/0094455 | A1 | 3/2025 | Bista et al. | |
| 2025/0259043 | A1* | 8/2025 | Crabtree | G06N 3/047 |
| 2025/0259085 | A1* | 8/2025 | Crabtree | G06F 12/0875 |
| 2025/0272567 | A1* | 8/2025 | Mukherjee | G06N 3/091 |
| 2025/0278634 | A1 | 9/2025 | Kumar et al. | |

OTHER PUBLICATIONS

Kingswell (Sequential Manifold Regularization for Large Language Model Contextual Stability); www.researchgate.net/; Aug. 2025. (Year: 2025).*

Zhang et al. (Hierarchical simplicial manifold learning, 2024) , https://doi.org/10.1093/pnasnexus/pgae530 Nov. 28, 2024 (Year: 2024) (Year: 2024).*

Sarfati et al. (Lines of Thought in Large Language Models),—arXiv preprint arXiv:2410.01545, 2024—arxiv.org (Year: 2024) (Year: 2024).*

Gao, Hang & Zhang, Yongfeng; "Memory Sharing for Large Language Model Based Agents", arXiv:2404.09982v2, Jul. 5, 2024.

Gim, In, et al.; "Prompt Cache: Modular Attention Reuse for Low-Latency Inference", arXiv:2311.04934v2, Apr. 2024.

Ramirez, Guillem, et al; "Cache & Distil: Optimising API Calls to Large Language Models", arXiv:2310.13561v1, Oct. 20, 2023.

Schroeder, Luis Gaspar; "VectorQ: Advanced Semantic Prompt Caching with Dynamic Thresholds and Performance-Based Clustering", Technical University of Munich, Nov. 26, 2024.

* cited by examiner

CURATION AND MEMORY-COMPRESSION CONTROLLER FOR COGNITIVE FABRICS

CROSS-REFERENCE TO RELATED APPLICATIONS

Priority is claimed in the application data sheet to the following patents or patent applications, each of which is expressly incorporated herein by reference in its entirety:

Ser. No. 19/451,374
Ser. No. 19/382,207
Ser. No. 19/203,069
Ser. No. 19/205,960
Ser. No. 19/060,794
Ser. No. 19/044,546
Ser. No. 19/026,276
Ser. No. 18/928,022
Ser. No. 18/919,417
Ser. No. 18/918,077
Ser. No. 18/737,906
Ser. No. 18/736,498
63/651,359
63/868,329
Ser. No. 19/397,858
Ser. No. 19/328,094
63/900,388
Ser. No. 19/321,173
Ser. No. 19/284,115
Ser. No. 19/051,193
63/847,082
63/847,091
63/847,096
63/847,101

BACKGROUND OF THE INVENTION

Field of the Art

The present invention relates to the field of artificial intelligence architectures employing geometric representations of memory, and more specifically to systems and methods for online curation and compression of manifold-encoded memory structures within cognitive computing environments.

Discussion of the State of the Art

Modern artificial intelligence systems often rely on vector-based memory stores, embedding spaces, or distributed databases to represent accumulated information and past interactions. These representations typically lack intrinsic geometric structure and therefore offer limited ability to evaluate memory quality, regulate memory growth, or maintain coherence across long operational periods. Existing systems generally treat memory as a passive repository into which information is inserted or from which information is retrieved, without providing mechanisms to assess the semantic or geometric value of stored content or to reorganize memory structures based on evolving operational needs.

Several approaches attempt to address memory redundancy or inefficiency by applying heuristic pruning rules, threshold-based deletion processes, nearest-neighbor deduplication, or periodic cleanup routines. These approaches, however, do not treat memory as a geometric space and therefore cannot characterize curvature, density, or stability of memory structures. Other methods employ offline batchprocessing or retraining cycles to reorganize memory or compress embeddings, but such techniques cannot operate continuously during online cognition and generally lack guarantees of stability, semantic fidelity preservation, or convergence. Moreover, existing systems do not integrate memory compression with higher-level identity constraints, do not provide principled mechanisms for ensuring that memory compaction remains consistent with core behavioral tendencies or reasoning principles, and do not support coordinated memory restructuring across distributed or federated computational environments.

Current systems also lack unified variational frameworks for memory evolution. While gradient-based processes are widely used in training machine learning models, they are not applied to the organization of runtime memory artifacts, and no existing technology provides a real-time controller that evaluates memory structures through a multi-term functional and applies geometric flows to reshape memory while the system remains fully online. Additionally, existing memory systems do not account for experiential meaning or resonance characteristics when performing compression, resulting in transformations that risk degrading semantic content or altering relationships essential for downstream reasoning.

As memory stores grow over time, the absence of principled curation and compression mechanisms leads to fragmentation, redundancy, curvature instability, and semantic drift. These deficiencies impair reasoning quality, slow retrieval operations, weaken long-term coherence, and prevent distributed AI systems from maintaining aligned and stable memory representations across multiple nodes. Existing architectures therefore fail to provide continuous, deterministic, geometric regulation of memory structure that preserves meaning, respects identity constraints, and ensures stability of compression dynamics.

What is needed is a system that evaluates memory as a geometric object, governs its evolution through stability-preserving variational flows, preserves semantic and experiential fidelity during compression, maintains compatibility with identity-level constraints, and operates continuously online to maintain coherent, efficient, and stable memory organization across both individual and distributed computational environments.

SUMMARY OF THE INVENTION

Accordingly, the inventor has conceived and reduced to practice a system that manages and compresses memory structures represented geometrically on a dedicated memory manifold. The system evaluates these memory structures through a multi-term curation functional, transforms them through stability-preserving compression flows that minimize that functional, applies additional geometric compression mechanisms, enforces compatibility with identity-level cognitive constraints, and reintegrates the resulting compressed memory back into persistent storage while preserving semantic and experiential meaning. Through these coordinated operations, the system provides an online, deterministic controller that maintains coherence, stability, and efficiency in the organization of memory.

In an embodiment, a computer system maintains a memory manifold stored in hardware memory in which memory structures are represented as geometric objects defined by a metric that determines geometric relationships among those structures. The system evaluates each memory structure by computing a curation functional that uses a plurality of measures, such as semantic utility, curvature complexity derived from the metric, and at least one of energy load, recurrence behavior, or divergence across nodes. The system transforms the memory structures through a compression flow based on the gradient of the curation functional with respect to the metric, with the flow operating to reduce the curation functional while preserving the semantic or experiential fidelity of the memory structures. The system also performs one or more additional compression operations, such as entropy-minimizing adjustments to memory bundles, curvature-regulated pruning, dimensionality-reducing projections between manifolds of differing dimension, or evolution of the manifold's metric according to usage. The system enforces compatibility constraints so that compressed memory structures remain consistent with identity-related information stored in a separate cognitive manifold hierarchy, and after compression, the system reintegrates the compressed memory structures into hardware memory for retrieval during later cognitive operations.

In an aspect of an embodiment, the compression flow operates at an intermediate timescale that is slower than event-level processing on a fast manifold of the cognitive hierarchy and faster than identity-level evolution on a foundational manifold.

In an aspect of an embodiment, the compression flow maintains a stability condition under which the curation functional decreases monotonically throughout the transformation process.

In an aspect of an embodiment, a feedback signal produced from the compressed memory structures is propagated to a foundational cognitive manifold so that compressed memory influences long-term evolution of the system's identity information.

In an aspect of an embodiment, enforcing compatibility between compressed memory structures and identity information includes preserving experiential resonance signatures so that compression does not alter underlying experiential meaning.

In an aspect of an embodiment, the system prioritizes memory structures for compression based on a priority measure that combines the curation functional with curvature magnitudes derived from the metric.

In an aspect of an embodiment, the computer system may include multiple processing nodes, each with its own memory manifold, and may compute a divergence measure that quantifies geometric incompatibility between memory manifolds on different nodes.

In an aspect of an embodiment, the system performs a consensus operation that adjusts the compression flow across nodes to reduce cross-node divergence while respecting autonomy constraints that prevent compression from collapsing distinctions in identity-level information between different nodes.

In an aspect of an embodiment, the compression flow operates continuously during online cognitive processing and omits stochastic perturbations, counterfactual generation, and exploratory trajectory-creation operations.

The invention also encompasses method and computer-readable-medium embodiments that perform or store instructions for performing the same functional operations described above, and these variations apply equally without requiring separate restatement herein.

BRIEF DESCRIPTION OF THE DRAWING FIGURES

DETAILED DESCRIPTION OF THE INVENTION

Figure 1:
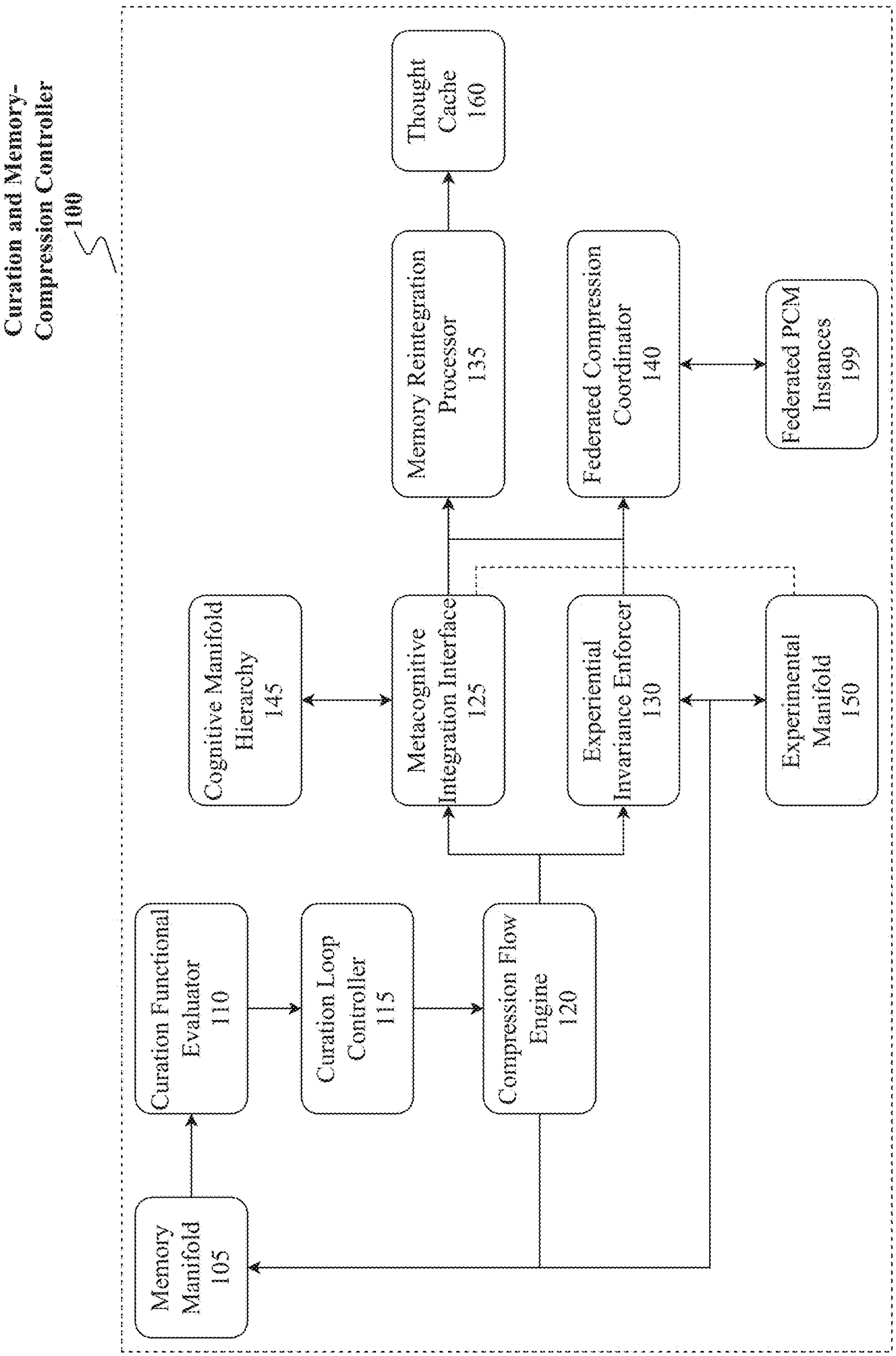
FIG. 1 illustrates an exemplary architecture of a curation and memory-compression controller configured to operate continuously on manifold-encoded memory structures.

The inventor has conceived and reduced to practice a system and method for online curation and geometric compression of memory structures represented on a dedicated memory manifold. This invention introduces a continuously operating controller that evaluates the geometric, semantic, and statistical properties of stored memory, reshapes those memory structures through stability-preserving flows, and maintains coherence between compressed memory representations and identity-level information maintained elsewhere in a cognitive architecture. Through these mechanisms, memory accumulations that would otherwise become redundant, curvature-imbalanced, or semantically diffuse over long operational periods are reorganized into compact, coherent, and semantically faithful forms while the system remains fully online.

In an embodiment, memory is represented on a memory manifold that provides a geometric substrate for thoughts, experiential bundles, narrative fragments, and other stored structures. This manifold may be a Riemannian space supporting a metric that determines distances, curvature quantities, and geometric relationships among memory structures. Each structure occupies coordinates inherited from embedding processes or experiential encodings, allowing the system to treat memory as a set of geometric objects that evolve under the curation and compression processes described herein.

Memory structures are evaluated through a curation functional that assigns a scalar quantity expressing how useful, stable, or costly a given structure is to maintain. In an embodiment, the functional may be written as $Q(T)=\alpha_1 U(T)+\alpha_2 C(T)+\alpha_3 E(T)+\alpha_4 R(T)+\alpha_5 \Delta(T)$, where U(T) reflects semantic utility, C(T) represents curvature cost, E(T) captures storage or activation burden, R(T) characterizes recurrence frequency, and Δ(T) measures divergence across distributed processing instances. Curvature cost may, for example, be computed by integrating a Ricci curvature term over a region associated with a memory structure. Recurrence may be evaluated by integrating an indicator function along an observed trajectory. Divergence may quantify geometric disagreement between memory representations maintained across different nodes in a distributed environment.

In an embodiment, memory structures evolve under a geometric compression flow defined by a gradient of the curation functional with respect to the memory manifold's metric. The evolution may satisfy $dT/dt=-\nabla_r Q(T)$, and in local coordinates may take a form such as dx^μ/dt=−g^{μν}(x) ∂Q/∂x^ν. This type of flow reduces the curation functional while preserving semantic and experiential fidelity of the structures. In systems employing embedding spaces, the gradient may be computed through a pullback using a Jacobian associated with an embedding map, permitting compression dynamics to operate across heterogeneous memory substrates.

Memory organization may additionally be shaped through entropy-minimizing behavior applied to experiential bundles. For example, bundle entropy may be represented as S_bundle=∫ ρ(x) log ρ(x) dμ(x), where ρ(x) measures memory density. A flow such as dB/dt=−∇_B S_bundle may contract high-entropy bundles while maintaining geometric and semantic coherence.

Dimensionality-reducing compression can also occur when memory structures are projected onto manifolds of lower dimension to improve compactness. An embodiment may implement such a projection through a mapping expressed as π_{i→j}(x)=arg min_{y∈M_j} $[d(x, y)^2+$ β|Curv_i(x)−Curv_j(y)|], identifying positions on a lower-dimensional manifold that preserve curvature alignment and semantic structure.

Regions that exhibit excessive curvature or geometric instability may undergo pruning through continuous contraction dynamics. For example, a curvature-regulated expression such as dT(x)/dt=−χ(κ(x)−κ_max) may be applied when a curvature value κ(x) exceeds a designated stability threshold. This provides a geometric rather than discrete deletion-based pruning technique, maintaining smooth evolution of memory structures.

A metric defined on the memory manifold may evolve along with the memory structures themselves. An embodiment may use an evolution rule such as ∂g/∂t=F(g, Q, ∇Q, usage), or may employ a Ricci-type update such as ∂g/∂t=−2 Ric(g)+λ g to reduce curvature concentration while preserving overall manifold volume. These transformations support long-term geometric stability and prevent accumulation of high-curvature distortions.

Memory curation may occur through a continuous loop that evaluates memory structures, selects regions that warrant compression, applies appropriate geometric flows, and reintegrates refined structures back into persistent memory. A composite update operator may be described as Γ_cur=Π_meta∘π_{i→j}∘Φ_comp∘$\nabla_r$Q, where Π_meta represents a compatibility projection that maintains consistency with identity information, π_{i→j} represents a dimensionality-reducing projection, Φ_comp represents a compression flow, and $\nabla_r Q$ represents a gradient evaluation. Curation may operate on a timescale lying between rapid perceptual processes and slow identity-level evolution, ensuring continuous refinement of memory without interfering with ongoing cognition.

A scheduling process may prioritize memory regions based on a term that accounts for both curation score and curvature magnitude. In an embodiment, a measure such as Ψ(x)=Q(x)+γ|Ric(x)| may identify regions with high geometric or semantic load. The system may then focus computation on the regions that maximize an integral of Ψ over candidate subsets of the manifold. A decision procedure may select among available compression actions by minimizing a functional that captures expected improvements in memory geometry or reductions in variance.

Compatibility with identity-level information is maintained during memory compression. Identity may be represented on a foundational manifold within a cognitive hierarchy, and compressed memory structures may be projected to forms that minimize geometric discrepancy relative to constraints imposed by that identity representation. An embodiment may represent such a projection as Π_meta(T)=arg min_{$\tilde{T}$} d(($\varphi_{23}\circ\varphi_{12}$)($\tilde{T}$), r(t)), where $\varphi_{23}$ and $\varphi_{12}$ represent upward abstraction maps and r(t) represents a foundational state. Memory compression may also influence identity-level evolution through a feedback expression such as Ω_meta(T)=∇_r ∫ C_meta(x) dμ(x), which may yield a foundational update law expressed as dr/dt=−η Ω_meta(T).

Memory compression may enhance stability of cognitive processing by reducing curvature concentrations that would otherwise propagate geometric tension into the cognitive manifold hierarchy. In an embodiment, the compression flow engine may induce corrections to the metrics $g_1$, $g_2$, and $g_3$ associated with manifolds $M_1$, $M_2$, and $M_3$ of the cognitive hierarchy through a stabilization operator Φ_comp: M_cur→End($g_1$, $g_2$, $g_3$). This operator modifies curvature inheritance maps that couple memory geometry to cognitive geometry, reducing commutativity residuals that arise when high-curvature memory regions force inconsistent constraints across manifold levels. By eliminating memory structures that contribute disproportionate geometric distortion, the compression controller reduces cognitive tension and improves coherence of reasoning processes that depend on stable geometric relationships among the hierarchical manifolds. This stabilization effect represents an indirect influence of memory compression on cognitive dynamics, distinct from the direct metacognitive feedback implemented through the operator Ω_meta.

Experiential fidelity is preserved during compression by enforcing invariance of resonance signatures or harmonic descriptors associated with experiential structures. In an embodiment, an invariance condition may require σ_exp(π(x))=σ_exp(x) for a compression mapping π. A projection term may be applied to ensure that compressed bundles remain within experiential submanifolds that maintain resonance-consistent geometry.

Compressed memory structures are reintroduced into persistent memory through reintegration onto valid regions of the memory manifold. For example, a reintegration operator $\mathcal{R}(\tilde{T})$ may identify manifold points minimizing a distance d_g(x, $\tilde{T}$), ensuring that compressed memory remains geometrically well-formed and available for future retrieval.

Distributed or federated deployments may employ multiple memory manifolds maintained by distinct processing instances. These instances may compute geometric divergence measures comparing their respective manifolds. For example, a divergence value D_cur may measure discrepancies by integrating squared differences of metric tensors composed under diffeomorphic transformations. A federated compression process may couple local curation with cross-instance divergence through a functional such as Q_fed=Σ Q(T^(i))+Σ λ_{ij} D_cur^(i,j), with each instance evolving its memory structures along a distributed gradient. Consensus operations may reduce divergence while respecting autonomy constraints that prevent collapse of foundational identity differences across instances. Memory density may be redistributed across instances through flows that balance local concentrations and avoid geometric singularities.

In an embodiment, curation activity may operate according to a defined temporal hierarchy that distinguishes the timescale of perceptual processing, the timescale of memory curation, and the timescale of foundational identity evolution. Event-level cognition may evolve on a fast manifold at a short interval sometimes denoted $\Delta t_1$. Curation may evolve on an intermediate timescale $\Delta t\_cur$ that is significantly slower than $\Delta t_1$ so that immediate perceptual dynamics are not disrupted. Foundational identity may evolve on a slow manifold at a timescale $\Delta t_3$ that is significantly longer than $\Delta t\_cur$. This separation of timescales, expressed as $\Delta t_1 \ll \Delta t\_cur \ll \Delta t_3$, permits continuous online memory shaping without destabilizing fast reasoning processes or prematurely altering long-term identity characteristics.

A continuously operating curation cycle may apply a composite update operator to memory structures across successive moments in time. In an embodiment, an operator $\Gamma\_cur$ may map a memory configuration at time t to a new configuration at time $t+\Delta t$ through a composition such as $\Gamma\_cur=\Pi\_meta \circ \pi\_\{i \rightarrow j\} \circ \Phi\_comp \circ \nabla_t Q$. This operator may evaluate memory structures, compute gradients of the curation functional, apply compression flows, project structures to lower-dimensional manifolds when appropriate, and finally enforce compatibility with identity constraints. By repeatedly applying $\Gamma\_cur$ in real time, memory evolves continuously toward stable and semantically coherent configurations.

Priority scheduling may guide the curation process toward regions of memory that exert disproportionate cognitive or geometric pressure. A priority field $\Psi(x)$ may be defined, for example, as $\Psi(x)=Q(x)+\gamma|Ric(x)|$, combining the curation score with a magnitude of curvature associated with the memory manifold. Regions that maximize an integral of this priority field over candidate subsets may be selected for focused curation activity. This prioritization permits computational resources to be directed toward areas exhibiting high curvature, high redundancy, or high semantic load, thereby improving overall system stability and efficiency.

In distributed environments, memory load may be redistributed across multiple processing instances so that no single instance accumulates excessive density or curvature. In an embodiment, a memory-density field $\rho(i)(x)$ associated with an instance may evolve under a flow such as $\partial\rho(i)/\partial t=-\nabla\cdot(\rho(i)\, V(i))+\Sigma\_\{j \neq i\}\ \kappa ij\ [\rho(j) \circ Pj \rightarrow i-\rho(i)]$, where $V(i)$ represents a local compression-induced vector field and $Pj \rightarrow i$ represents a projection between memory manifolds. This equation may diffuse memory density away from overloaded regions while receiving contributions from compatible structures on other instances, enabling smooth redistribution that preserves both geometric and semantic relationships.

Well-posedness of the compression dynamics may be supported through several structural conditions. Bounded curvature on a memory manifold may ensure that geometric quantities remain finite during evolution. Compact sublevel sets of a curation functional may guarantee that gradient descent flows remain confined within stable regions of memory space. Step-size limitations in discrete implementations may further maintain stability of numerical approximations to continuous flows. These assumptions permit the system to maintain predictable behavior across long operational intervals.

In an embodiment, memory trajectories representing multi-step cognitive sequences may be simplified through a variational process that identifies a canonical representative path. A rebinding trajectory $\gamma\_reb$ may satisfy an optimization such as $\gamma\_reb=\arg\min \int_0^T (\|\gamma^*(t)\|^2+\lambda\ Ric(\gamma(t)))\, dt$, producing a geodesic-like curve that preserves long-range semantic relationships while removing redundant deviations. This provides a means to compress sequential memory representations into compact geometric forms.

Memory may also be represented in discrete or graph-based structures. In such settings, a compression operation may identify contraction targets through a mapping such as $\pi\_graph(u)=\arg\min\_\{v\}\ [dist(u, v)^2+\beta|\kappa(u)-\kappa(v)|]$, where $\kappa(u)$ represents a curvature-related quantity associated with a node. This type of contraction preserves key geometric features while reducing graph complexity in a continuous and controllable manner.

A further distinction is maintained between online compression dynamics and offline processes associated with generative or exploratory behavior. Compression does not introduce new trajectories, stochastic perturbations, counterfactual variations, or topological modifications. Any mechanism that creates new memory structures, explores alternative trajectories, or performs annealing or hallucination-like operations is reserved for offline contexts outside the present invention. This doctrinal boundary ensures that memory curation remains deterministic, stable, and focused solely on refinement of existing structures.

The described system operates as an online, deterministic, fidelity-preserving controller for memory evolution. Compression dynamics do not introduce stochastic perturbations, counterfactual trajectories, generative variations, annealing processes, or topology-altering transformations. Stability is supported by bounded curvature, compact sublevel sets of the curation functional, and suitable step-size constraints for discrete implementations. Through these mechanisms, memory remains coherent, compact, and semantically meaningful across extended periods of operation.

In an embodiment, the system may operate as a continuously learning research assistant that interacts with technical documents, mathematical reasoning chains, and user-generated inquiries across long operational intervals. As the system receives dense and highly clustered information related to specialized technical subjects, memory structures within the memory manifold may accumulate in certain regions, producing curvature concentrations and redundancy that degrade retrieval quality. The curation functional may detect that these regions exhibit elevated curvature complexity and repeated patterns of visitation. A gradient-based compression flow may then gradually contract redundant subregions, merge overlapping representations, and reshape memory trajectories so that they align more closely with geodesic pathways that represent stable technical themes. The system may also apply entropy-minimizing bundle compression to experiential bundles that represent multi-document technical contexts, producing more coherent and compact structures while preserving semantic meaning. Through these continuous operations, the system may maintain a highly organized memory geometry that enables faster and more accurate retrieval of technical insights during subsequent reasoning tasks.

In another embodiment, the system may act as a long-running conversational partner for users who interact intermittently throughout the day. Each interaction may deposit thought structures representing user intent, personal preferences, and contextual themes related to ongoing projects. Over time, experiential bundles representing these interactions may expand in density and curvature. The system may apply bundle-entropy compression to consolidate repeated conversational motifs into canonical experiential representations, while resonance constraints preserve experiential meaning such as emotional tone or thematic emphasis. When the user returns after an extended gap, the system may retrieve content from the reorganized memory manifold with improved coherence, enabling seamless continuation of prior discussions without requiring the user to re-establish context.

In a distributed enterprise environment, the system may be deployed across multiple processing nodes that each maintain a distinct memory manifold. For example, separate instances may serve different business units or geographic regions. As each node accumulates local memory shaped by unique experiences, geometric divergence may increase between their memory manifolds. The system may compute a divergence measure quantifying these differences and may apply a consensus operation to gradually reduce geometric incompatibility. Memory structures representing shared concepts, such as organizational policies or domain knowledge, may then converge toward compatible geometric forms while autonomy constraints ensure that identity-level distinctions, such as local domain expertise, are preserved. The distributed architecture may also apply a load-balancing flow that redistributes memory density across nodes when one instance becomes overloaded, allowing the system to maintain stable geometric organization at scale.

In another embodiment, the system may operate within an automated monitoring environment, where streams of events from sensors or operational logs are encoded as memory trajectories traversing the memory manifold. Repeated patterns in these trajectories may exhibit unnecessary deviations or oscillations. The system may apply a trajectory rebinding process that computes a geodesic-like representative path by minimizing a functional such as $\int(\|\gamma^*(t)\|^2+\lambda \, \mathrm{Ric}(\gamma(t)))\,dt$. This produces a compressed representation that preserves the essence of observed operational behavior while smoothing out noise or irregularities. Subsequent detection or analysis routines may use these rebinding trajectories to improve pattern recognition and anomaly identification.

In an embodiment where memory is represented in part through graph-like structures derived from discrete data, the system may maintain an embedded graph manifold in which nodes represent cognitive or experiential units and edges represent relationships learned through activity. Over time, densely connected regions may accumulate redundant or semantically overlapping nodes. The system may apply a graph-based contraction mapping such as $\pi\_graph(u)=\arg\min\_v\ [dist(u, v)^2+\beta|\kappa(u)-\kappa(v)|]$ to identify contraction targets for each node. Curvature-aware contraction may gradually collapse redundant subgraphs while preserving essential structural and semantic relationships within the discrete representation, enabling efficient traversal and long-term maintainability of the graph memory.

The system may also engage in practical reasoning tasks where certain memory structures become disproportionately influential due to repeated activation or contextual prominence. Such structures may develop high curvature or density and exert geometric pressure on nearby regions of the memory manifold. The system may detect such situations through the priority measure $\Psi(x)=Q(x)+\gamma|\mathrm{Ric}(x)|$ and direct compression efforts toward these overloaded regions.

For example, when the system serves as an assistant in a legal analysis environment, memory related to an actively debated issue may accumulate along multiple semantic directions. Priority-guided compression may reorganize these structures to reduce redundancy while preserving essential distinctions between legal arguments, case precedents, and regulatory interpretations, thereby improving retrieval quality during ongoing analysis.

In a long-term operational context such as autonomous system management, the system may accumulate memory representing repeated cycles of operational behavior. These cycles may involve recurring sequences such as startup conditions, error-handling routines, or maintenance activities. Without compression, these sequences may grow increasingly redundant, and subtle differences in structure across cycles may introduce curvature inconsistencies. The system may apply dimensionality-reducing projections to identify a core manifold structure that captures the stable geometry of these operational cycles, reducing long-term storage burden while enabling fast recognition of deviations from expected behavior.

These examples illustrate various contexts in which the system may continuously curate and compress memory structures to maintain coherence, stability, and efficiency in both standalone and distributed environments. None of these examples are limiting, and the system may be applied in any setting where memory is represented as a geometric object subject to continuous online refinement.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "action space" refers to a non-limiting collection of geometric transformation types that may be selected during memory curation, including contraction, merging, refactoring, dimensionality reduction, and curvature-regulated pruning.

As used herein, "bundle entropy" refers to an entropy measure defined over an experiential bundle and used to evaluate geometric or semantic density associated with that bundle.

As used herein, "candidate region" refers to any system-generated subset of a memory manifold evaluated for potential curation based on a priority measure.

As used herein, "compatibility projection" refers to any geometric projection that adjusts a memory structure such that it complies with identity-level constraints imposed by a cognitive manifold hierarchy.

As used herein, "compression flow" refers to any deterministic geometric transformation applied to a memory structure to reduce a curation functional while preserving semantic or experiential fidelity.

As used herein, "compression submersion" refers to any mapping from a higher-dimensional memory manifold to a lower-dimensional manifold that preserves curvature alignment or semantic structure.

As used herein, "consensus adjustment" refers to any gradient-derived correction applied to memory structures across distributed instances to reduce cross-agent memory divergence.

As used herein, "curation action" refers to a selected geometric transformation or compression mechanism evaluated by a curation loop controller for application to a memory structure or region.

As used herein, "curation functional" refers to a multi-term function that assigns a scalar score to a memory structure based on semantic utility, curvature cost, energy load, recurrence behavior, divergence, or any combination thereof.

As used herein, "curvature-regulated pruning" refers to any geometric contraction applied when curvature exceeds a designated stability threshold.

As used herein, "distributed cognitive fabric" refers to any collection of persistent cognitive machine instances that maintain respective memory manifolds and participate in federated curation or compression.

As used herein, "experiential invariance" refers to any condition requiring that resonance signatures or other experiential descriptors remain unchanged under memory compression.

As used herein, "federated curation functional" refers to a functional combining local curation terms with cross-instance divergence penalties to define fabric-level compression dynamics.

As used herein, "geometric divergence" refers to any measure of incompatibility between two memory manifolds expressed in terms of differences between geometric quantities such as metrics or curvature.

As used herein, "gradient evaluation" refers to computation of a derivative of a curation functional or divergence functional with respect to coordinates on a memory manifold or an embedding thereof.

As used herein, "identity-level constraint" refers to any constraint derived from a foundational manifold or cognitive hierarchy that limits how memory structures may evolve under compression.

As used herein, "memory manifold" refers to a geometric space, such as a Riemannian manifold, that encodes memory structures as geometric objects possessing coordinates, curvature, and metric-defined relationships.

As used herein, "memory structure" refers to any representational unit stored on a memory manifold, including points, curves, regions, trajectories, or experiential bundles.

As used herein, "metric evolution" refers to any update to the metric tensor of a memory manifold performed to reduce curvature concentration or geometric complexity.

As used herein, "priority field" refers to any scalar field defined on a memory manifold that ranks memory regions based on curation scores, curvature magnitudes, or related geometric quantities.

As used herein, "product manifold" refers to a manifold formed from the Cartesian product of memory manifolds maintained by multiple persistent cognitive machine instances.

As used herein, "resonance-consistency operator" refers to any operator that adjusts memory structures such that experiential resonance signatures or harmonic descriptors are preserved during compression.

As used herein, "stability condition" refers to any condition requiring monotonic reduction of a curation functional or boundedness of geometric quantities during a compression flow.

As used herein, "trajectory rebinding" refers to any variational process that replaces a memory trajectory with a curvature-suppressed geodesic representative of its equivalence class.

As used herein, "variational flow" refers to any geometric evolution of a memory structure driven by the gradient of a functional defined over the memory manifold.

Conceptual Architecture of a Curation and Memory-Compression Controller

FIG. 1 is a block diagram illustrating an exemplary architecture of a curation and memory-compression controller 100, in an embodiment. A curation and memory-compression controller 100 is configured to operate continuously on memory structures represented as geometric objects and may interface with external architectural elements inherited from related cognitive systems. Within the controller 100, a memory manifold 105 provides a geometric substrate in which memory structures reside and supports a Riemannian metric defining distances, curvature, and other geometric relationships among those structures. Memory structures from the memory manifold 105 are supplied to a curation functional evaluator 110, which is configured to compute a scalar curation score for each structure using a weighted combination of geometric and statistical measures, including semantic utility, curvature complexity, energy load, recurrence behavior, and cross-node divergence.

The curation functional evaluator 110 provides curation scores and recurrence data to a curation loop controller 115, which is configured to prioritize memory regions for compression based on a priority field derived from the curation scores and curvature magnitudes, and to select curation actions that reduce memory redundancy while preserving fidelity. A curation loop controller 115 directs selected memory structures to a compression flow engine 120, which is configured to apply geometric transformations designed to reduce the curation functional under stability and fidelity constraints. The compression flow engine 120 may implement gradient-based compression flows, entropy-minimizing bundle dynamics, curvature-regulated pruning, dimensionality-reducing projections between manifolds, or metric evolution equations that reduce geometric complexity in overpopulated regions. Updated metric information computed by the compression flow engine 120 is propagated back to the memory manifold 105 to reflect structural changes induced by compression.

Experiential bundles identified as sufficiently similar under the curation functional may be merged through a variational homotopy that continuously deforms one bundle into another while minimizing deformation energy. In an embodiment, when two bundles $B_1$ and $B_2$ residing in the experiential-curated subset of the memory manifold satisfy a similarity threshold, the system may construct a homotopy H: $[0, 1]\times B_1 \rightarrow$ M_exp-cur such that H(0, x)=x and H(1, x) $\in B_2$. The homotopy may be selected to minimize an energy functional expressed as $E[H]=\int_0^1$ ∫_{$B_1$} ||∂t H(t, x)$\|^2${g_exp} dμ(x) dt, where g_exp denotes the metric on the experiential manifold and ∂_t H represents the velocity of the deformation at each point. The merged bundle B_merged=H(1, $B_1$) constitutes a curvature-smoothed synthesis of both input bundles. This merging operation is a continuous geometric deformation that consolidates redundant experiential content without introducing stochastic recombination or generative variation, maintaining the deterministic character of the compression controller.

Compressed structures from the compression flow engine 120 flow in parallel to both a metacognitive integration interface 125 and an experiential invariance enforcer 130 for constraint validation. The metacognitive integration interface 125 is configured to enforce compatibility between compressed memory and identity-level information stored in a cognitive manifold hierarchy 145, comprising manifold levels that evolve at progressively slower timescales. Through this interface, compressed structures may be projected onto configurations that minimize discrepancy with foundational constraints derived from immersion maps, and feedback signals computed from compression dynamics may propagate to a foundational manifold to influence long-term identity evolution. The experiential invariance enforcer 130 is configured to query resonance signatures and harmonic descriptors from an experiential manifold 150, and to validate that compression operations preserve experiential meaning. In cases where compression alters a resonance signature, a projection operator may be applied to restore consistency.

Structures that satisfy both metacognitive compatibility and experiential invariance are passed to a memory reintegration processor 135, which is configured to reintegrate compressed and validated structures into valid regions of the memory manifold 105 and to supply them to a thought cache 160 for persistent storage and future retrieval. In distributed deployments, a federated compression coordinator 140 is configured to manage memory compression across a cognitive fabric of interconnected processing instances. The coordinator 140 computes cross-node divergence measures quantifying geometric incompatibility between memory manifolds, applies consensus updates that adjust local compression flows to reduce divergence, and enforces autonomy constraints that prevent memory blending when foundational identity divergence exceeds a system-defined threshold. Divergence values computed by the coordinator 140 are supplied upstream to the curation functional evaluator 110 for incorporation into per-structure curation scores.

In various embodiments, the system may be deployed across one or more persistent cognitive machines (PCMs) 199, each comprising a self-contained cognitive architecture that includes a memory manifold, experiential processing modules, and identity-level representations governed by a cognitive manifold hierarchy. PCM instances may operate independently or cooperatively within a federated cognitive fabric, executing local curation and compression flows while participating in distributed coordination through divergence-aware consensus mechanisms. Over time, memory manifolds maintained by different PCMs may diverge due to variations in experience, operational input, or foundational identity trajectory. The federated compression architecture mitigates this divergence by aligning memory geometry across instances while preserving per-agent autonomy and identity distinctions.

Data flow through the controller 100 proceeds through a structured sequence of evaluation, prioritization, compression, constraint enforcement, and reintegration. Memory structures originate in the memory manifold 105, which may receive experiential bundles from the experiential manifold 150, and are evaluated in the curation functional evaluator 110. Scores and curvature data flow to the curation loop controller 115, which selects structures and actions for compression. These selected structures are processed by the compression flow engine 120, which applies one or more geometric transformations and returns metric updates to the memory manifold 105. Compressed structures then flow in parallel to the metacognitive integration interface 125 and experiential invariance enforcer 130, where they are validated against identity-level and experiential constraints, respectively. Validated structures are then converged at the memory reintegration processor 135, which re-embeds them into the memory manifold 105 and supplies them to the thought cache 160. In federated configurations, the federated compression coordinator 140 exchanges divergence data with other PCM instances 199 and couples local curation dynamics with fabric-wide compression alignment via consensus operations and divergence-aware feedback to the curation functional evaluator 110.

This architectural configuration supports continuous, online compression of memory structures while preserving coherence, semantic fidelity, and alignment with identity-level constraints across both local and distributed cognitive systems.

Figure 2:
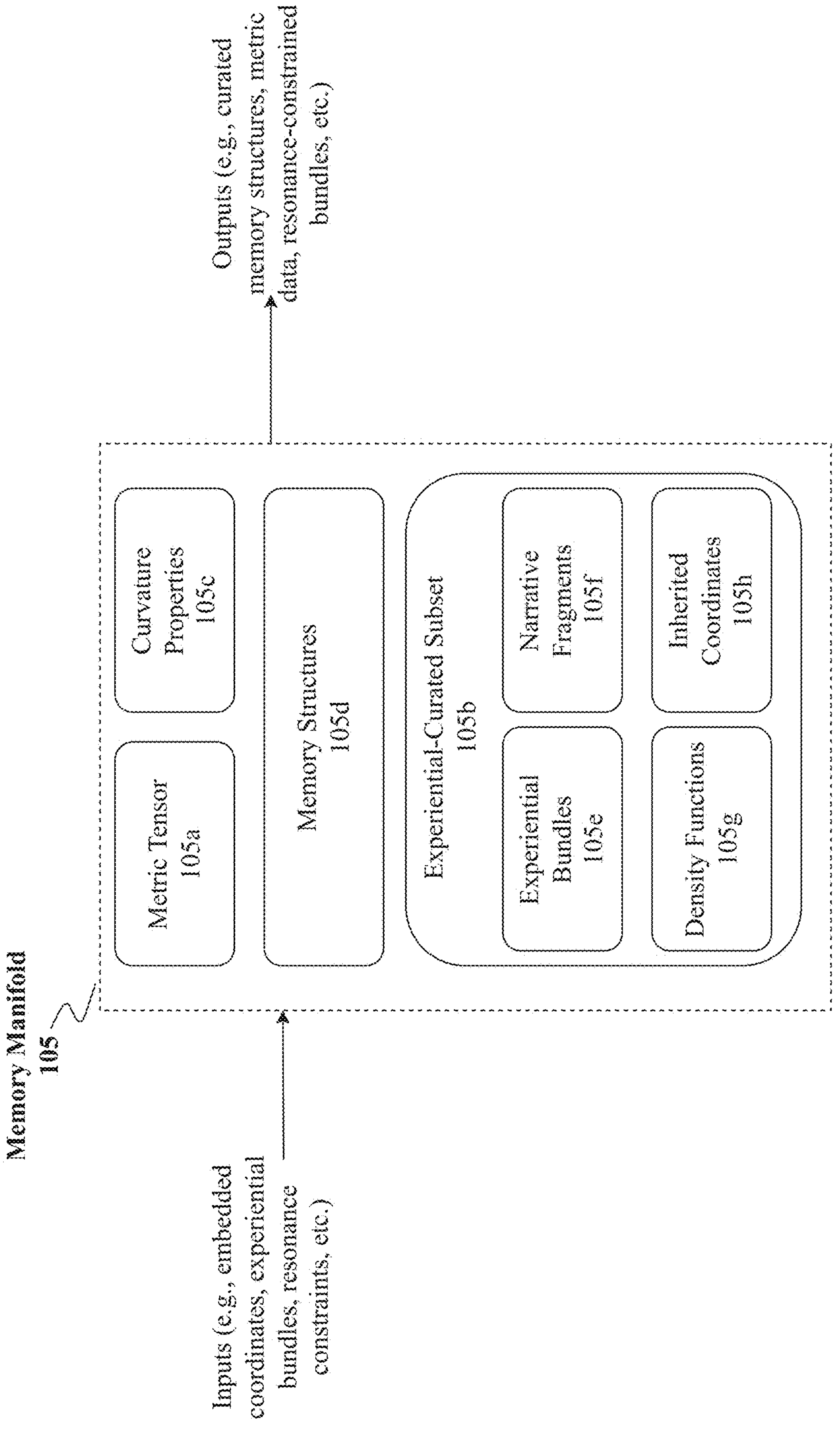
FIG. 2 illustrates an exemplary memory manifold defining the geometric substrate on which memory structures are embedded, evaluated, and transformed.

FIG. 2 is a block diagram illustrating the internal structure of a memory manifold 105, which serves as the geometric substrate on which memory structures are embedded, evaluated, and transformed. The memory manifold supports curation and compression operations executed by controller 100 and is realized as a continuous Riemannian space equipped with a metric tensor 105*a*. This metric defines intrinsic geometric relationships among memory elements, including distance functions, geodesic paths, and curvature quantities such as Ricci and sectional curvature. These geometric properties, denoted collectively as curvature properties 105*c*, are derived from the metric tensor and inform memory evaluation through curvature-sensitive flows and pruning dynamics.

Each memory structure within manifold 105, collectively referenced as 105*d*, occupies a geometric form such as a point, curve, region, or bundle. Points may represent atomic thoughts; curves may encode reasoning trajectories or episodic sequences; regions may define concept clusters; and bundles represent structured groupings of related memory elements with shared semantic or experiential properties. All memory structures inherit local coordinates and curvature from the ambient manifold geometry, allowing for their evaluation under the system's curation functional and transformation under variational compression flows.

In an embodiment, a memory cluster may be distributed radially around a central axis in a two-dimensional region of the memory manifold equipped with a polar-coordinate metric such as $g\_cur=dr^2+f(r)^2d\theta^2$, where r denotes radial distance and θ denotes angular position. The curation functional for such a cluster may reduce to $Q(C)=\alpha_1 \int\_C\ U(x)\ d\mu+\alpha_2 \int\_C\ Ric(x)\ d\mu$, aggregating semantic utility and curvature cost over the cluster region. The compression flow may then evolve the radial coordinate according to dr/dt=−g^{rr}_cur ∂Q/∂r, which contracts the radial extent of the cluster toward lower-curvature configurations. Through this contraction, the system removes geometric redundancy by consolidating distributed memory elements into a more compact radial region while preserving the angular distribution of semantic content. This embodiment illustrates how the compression controller operates on memory structures with rotational organization, such as memory clusters representing cyclic processes, periodic themes, or phase-organized experiential content.

In an embodiment demonstrating unified operation of curation, compression, reintegration, and metacognitive compatibility on a minimal geometric domain, the memory manifold may be represented as a unit square $M\_cur=[0, 1]^2$ equipped with a Euclidean metric $g\_cur=dx^2+dy^2$. A memory cluster centered at coordinates (½, ½) may be subject to compression under a curation functional such as $Q(x, y)=\alpha_1 U(x, y)+\alpha_2(x^2+y^2)$, combining a semantic utility term with a quadratic curvature-proxy term. The compression flow becomes d/dt(x, y)=−(∂Q/∂x, ∂Q/∂y), evolving the cluster toward configurations that minimize Q. An experiential invariance constraint may require that compressed structures remain on a resonance submanifold defined by a condition such as x+y=constant, ensuring that compression preserves experiential meaning encoded along this diagonal direction. Application of the compression flow yields a contracted cluster that satisfies both the curation-minimizing tendency and the resonance invariance constraint. Reintegration into the memory manifold is straightforward because the unit square domain is convex, ensuring that projected positions remain within valid manifold coordinates. This embodiment demonstrates the operability of every major operator introduced in the invention within a geometrically transparent setting.

A designated region of the manifold, referred to as the experiential-curated subset 105*b*, contains memory structures linked to experiential input. This subset includes experiential bundles 105*e*, narrative fragments, and resonance states 105*f*, each encoding semantic and affective meaning derived from user interaction or environmental context. Structures in this subset are subject to entropy-minimizing compression governed by the functional S_bundle=∫ ρ(x)·log(ρ(x)) dμ(x), where ρ(x) is a density function 105*g* over the bundle and dμ(x) is the induced volume form. These compression flows operate under fidelity constraints to reduce redundancy while maintaining semantic and geometric coherence. Inherited coordinates 105*h* are positional embeddings derived from upstream embedding processes that map high-dimensional content into the geometric frame of manifold 105.

The memory manifold also interfaces with other architectural elements. Structural and metric data from manifold 105 flow to a curation functional evaluator, which assigns a scalar score Q(T) to each structure based on semantic utility, curvature cost, energy load, recurrence behavior, and divergence. In parallel, an experiential manifold provides resonance constraints that ensure compression of structures within subset 105*b* preserves experiential meaning. This constraint may be expressed through resonance invariance conditions such as σ_exp(π(x))=σ_exp(x), where σ_exp denotes the resonance signature and π(x) is a compression submersion. Input to the memory manifold may include embedded representations of symbolic, perceptual, or experiential content generated through interaction with external systems or environments. Output from the manifold includes, for example, curated and compressed memory structures that are reintegrated into persistent memory, scored by the curation evaluator, and made available for downstream cognitive processes such as retrieval, reasoning, or identity-level projection.

FIG. 2 illustrates only one exemplary embodiment of a memory manifold 105. In practice, manifold topology, structural distribution, and curvature properties may vary significantly across persistent cognitive machines (PCMs) depending on domain, operational history, and user interaction patterns. For example, a PCM used for regulatory compliance analysis may develop densely curved regions corresponding to high-frequency legal motifs, while a PCM operating in a sensory robotics domain may exhibit broad, smooth manifolds shaped by spatial trajectories and real-time observations. In multi-agent deployments, each memory manifold may evolve independently while participating in federated compression coordination, further diversifying the structural characteristics of manifold 105 across instances.

This figure is therefore intended to illustrate a representative structural pattern rather than a fixed design, and variations in manifold geometry, structure types, and compression dynamics are all within the scope of the described system.

Figure 3:
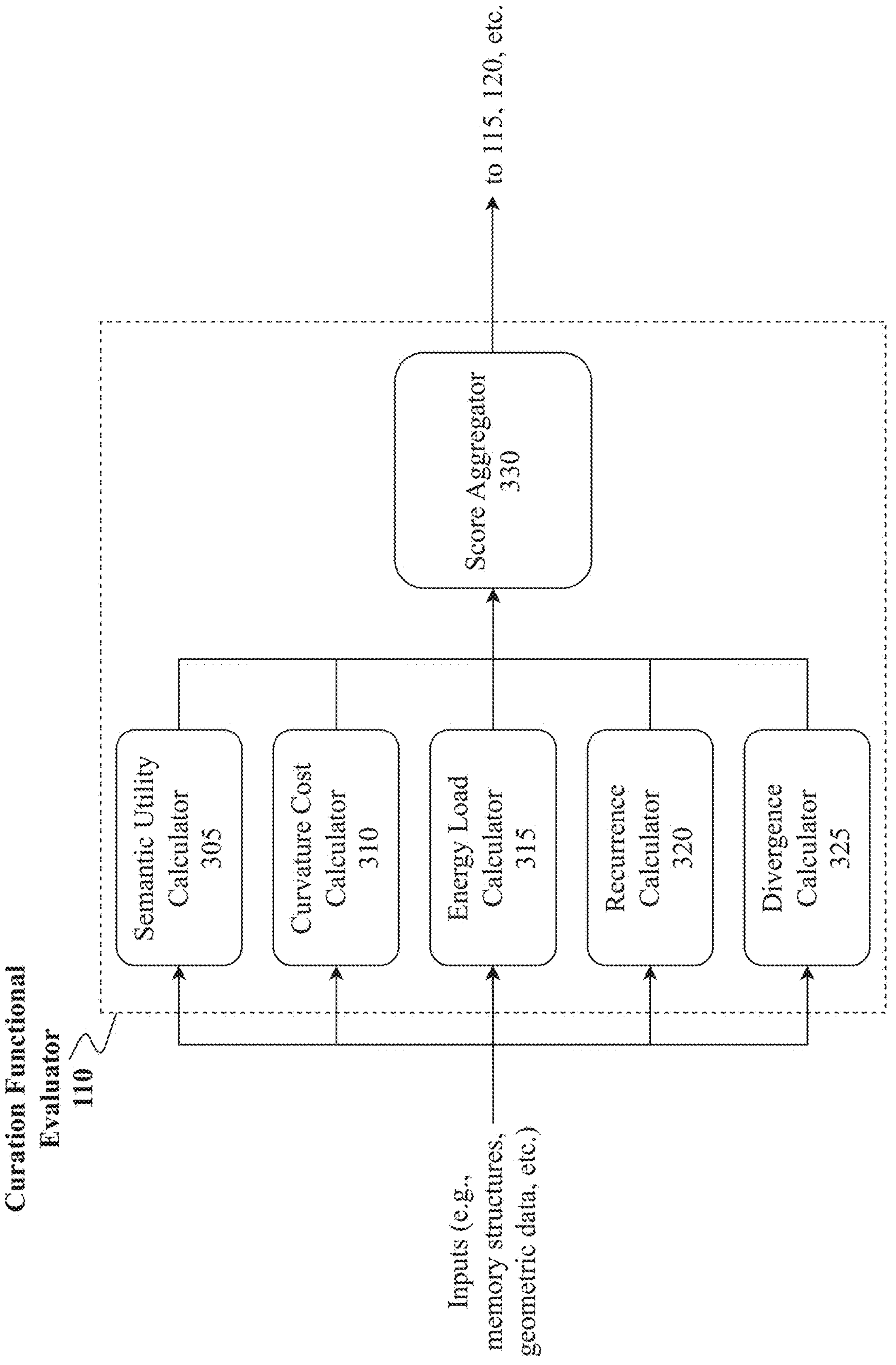
FIG. 3 illustrates an exemplary curation functional evaluator configured to compute geometric and statistical measures used to determine memory-structure disposition.

FIG. 3 is a block diagram illustrating an exemplary architecture of a curation functional evaluator within a curation and memory-compression controller, in an embodiment. A curation functional evaluator 110 is configured to receive memory structures and associated geometric data from a memory manifold 105 and to compute a scalar score Q(T) used to determine how each memory structure is handled during subsequent compression operations. The evaluator 110 may comprise a plurality of component-calculation units arranged in parallel, each configured to compute a respective component measure, and a score aggregator 330 configured to combine those measures into a single output value. Data from the memory manifold 105 and from a federated compression coordinator 140 flows into the evaluator 110 and is routed to the relevant calculation units based on the nature of each computation.

A semantic utility calculator 305 is configured to compute a measure U(T) that quantifies alignment of a memory structure with recurrent geodesic tendencies, stable memory bundles, or long-term semantic directions represented on the memory manifold. A curvature cost calculator 310 is configured to compute a measure C(T) representing geometric complexity associated with the memory structure, which may be derived by integrating a curvature quantity, such as a Ricci curvature term, over a region determined by the coordinates of the structure using the metric tensor received from the memory manifold 105. An energy load calculator 315 is configured to compute a measure E(T) representing a storage burden, embedding magnitude, or activation cost associated with maintaining the memory structure.

A recurrence calculator 320 is configured to compute a measure R(T) representing temporal frequency or manifold-visitation density, which may be determined by integrating an indicator function along an observed trajectory corresponding to recent system activity. A divergence calculator 325 is configured to compute a measure Δ(T) that quantifies cross-agent discrepancy for memory structures in federated deployments, based on divergence metrics supplied by the federated compression coordinator 140. Each calculation unit outputs its respective component measure to the score aggregator 330.

A score aggregator 330 is configured to receive the component measures and to compute a weighted combination expressed as $Q(T)=\alpha_1 U(T)+\alpha_2 C(T)+\alpha_3 E(T)+\alpha_4 R(T)+\alpha_5 \Delta(T)$, where the weighting coefficients $\alpha_1$ through $\alpha_5$ may be fixed or may adapt based on operational conditions of the system. The resulting score Q(T) serves as a variational quantity that informs downstream geometric compression flows. The score aggregator 330 outputs the curation score Q(T) to a curation loop controller 115, which is configured to prioritize memory regions for compression, and to a compression flow engine 120, which is configured to transform memory structures based on gradients of the curation functional.

In an embodiment, the curation functional evaluator 110 provides the variational quantity that forms the ∇T Q component of the composite curation operator Γ_cur and supplies the scalar field used by the curation loop controller 115 to construct priority measures such as $\Psi(x)=Q(x)+\gamma|Ric(x)|$ and to support multi-criteria action selection. The divergence component Δ(T) may be derived from metric and foundational divergence indices inherited from the federated architecture, enabling Q(T) to contribute to the fabric-level functional Q_fed used in distributed compression alignment. Each component calculator may compute its respective measure using either intrinsic manifold coordinates or embedding-space pullbacks, maintaining substrate-neutral realizability. The evaluator operates deterministically and does not generate new memory structures or stochastic variations, but instead supplies the geometric and statistical scores that guide subsequent compression flows within the online, stability-preserving regime of the controller.

Figure 4:
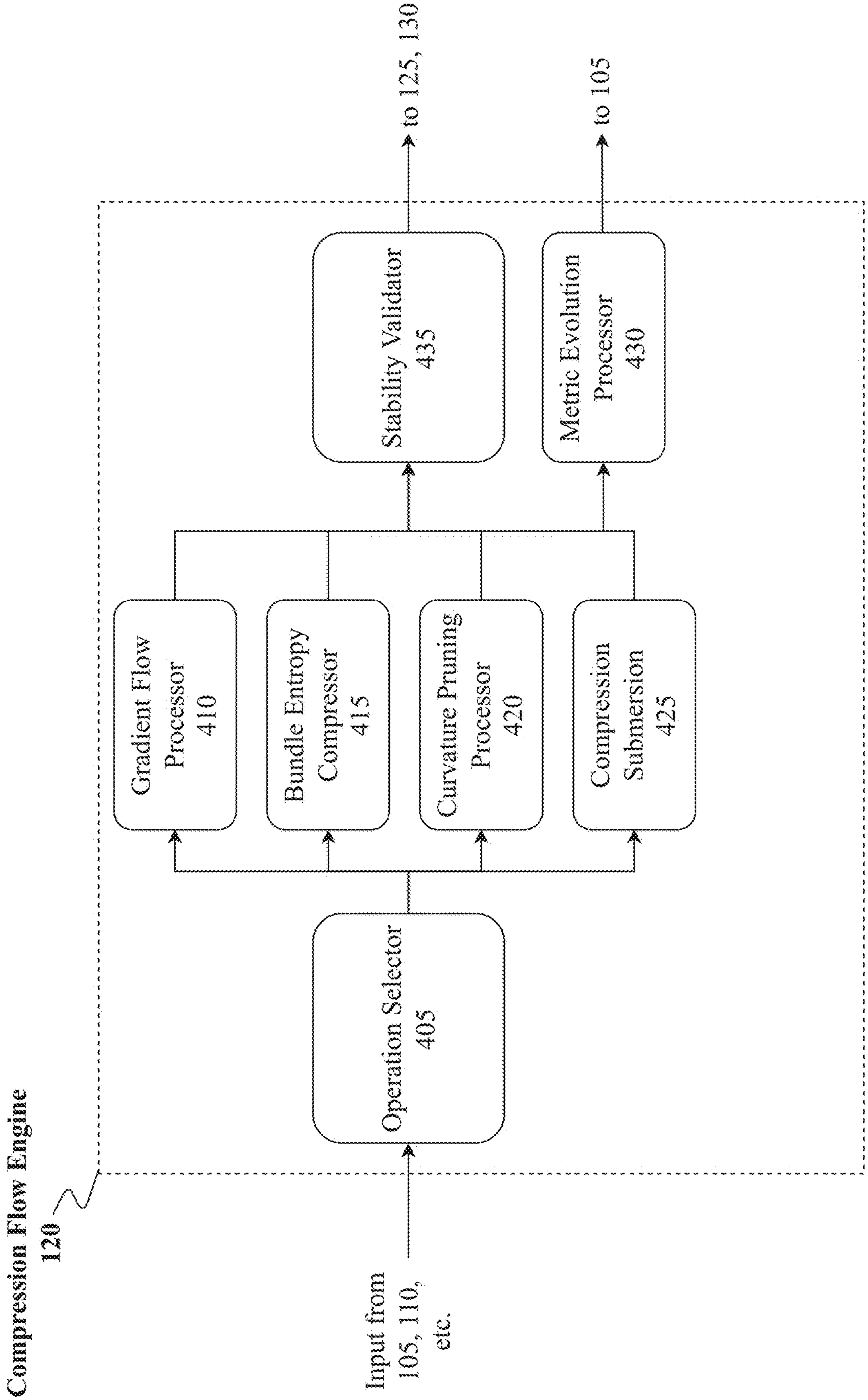
FIG. 4 illustrates an exemplary compression flow engine implementing gradient-based, entropy-minimizing, curvature-regulated, dimensionality-reducing, and metric-evolution compression mechanisms.

FIG. 4 is a block diagram illustrating an exemplary architecture of a compression flow engine within a curation and memory-compression controller, in an embodiment. A compression flow engine 120 is configured to receive memory structures and associated geometric data from a memory manifold 105, curation scores and gradient information from a curation functional evaluator 110, action-selection signals from a curation loop controller 115, and constraint data from an experiential invariance enforcer 130. The engine 120 may comprise an operation selector 405 configured to dispatch memory structures to one or more compression mechanisms, a plurality of structure-transforming processors implementing the system's geometric compression flows, a stability validator 435 configured to verify that compression dynamics satisfy stability requirements, and a metric evolution processor 430 configured to update the memory-manifold metric in response to compression activity. The compression flow engine 120 constitutes the Φ_comp component of the composite curation operator Γ_cur.

An operation selector 405 receives action-selection signals from the curation loop controller 115 and routes memory structures to one or more compression mechanisms according to the selected curation action. The selector 405 may incorporate constraint signals from the experiential invariance enforcer 130 to ensure that chosen flows remain consistent with resonance-invariance requirements. A gradient flow processor 410 is configured to advance memory structures under a Riemannian gradient flow expressed as $dT/dt=-\nabla T\ Q(T)$. The processor 410 may compute gradients via an embedding-space pullback using a Jacobian associated with an embedding map, permitting compression to operate across heterogeneous memory substrates while ensuring monotonic descent of the curation functional.

A bundle entropy compressor 415 is configured to implement entropy-minimizing dynamics for experiential bundles, contracting high-entropy regions into more coherent geometric forms according to a flow such as $dB/dt=-\nabla B\ S\_bundle$, subject to experiential invariance constraints. A curvature-regulated adjustment processor 420 is configured to apply continuous contraction dynamics to memory regions whose curvature exceeds a designated stability threshold, reducing geometric distortion and curvature concentration without relying on discrete deletion operations. A compression submersion processor 425 is configured to project memory structures onto manifolds of reduced dimension through a mapping that preserves curvature alignment and semantic structure. This projection operates on memory geometry rather than abstraction between cognitive manifold levels and therefore differs from submersions used within a metacognitive hierarchy. The compression mechanisms provided by processors 410, 415, 420, and 425 may be applied independently, sequentially, or as composed operators, reflecting the flexible structure of Γ_cur.

Each of the structure-transforming processors outputs updated memory structures to a stability validator 435. The stability validator 435 is configured to verify that the applied compression dynamics satisfy a Lyapunov-like monotonicity condition under which the curation functional does not increase. The validator 435 may further evaluate bounded-curvature conditions, compactness of relevant sublevel sets, and well-posedness constraints for discretized implementations of the compression flow. Structures that satisfy these stability conditions are forwarded to a metacognitive integration interface 125, which is configured to impose compatibility with identity-level constraints, and to an experiential invariance enforcer 130, which is configured to ensure preservation of experiential meaning and resonance signatures during compression.

A metric evolution processor 430 is configured to receive information describing recent compression activity—including curvature adjustments, density changes, and usage-related signals from the memory manifold—and to update the metric tensor of the memory manifold accordingly. The processor 430 may apply a curvature-dependent evolution rule such as ∂g/∂t=F(g, Q, ∇Q, usage), which may include Ricci-type smoothing to redistribute curvature or reduce geometric complexity in regions influenced by compression flows. These metric updates constitute the fifth compression mechanism of the system and are supplied to the memory manifold 105, completing a feedback path through which compression operations may reshape the geometric substrate on which memory structures reside. The compression flow engine 120 operates in a strictly online and deterministic regime, excluding any stochastic, generative, or exploratory operations reserved for offline adaptation mechanisms.

Figure 5:
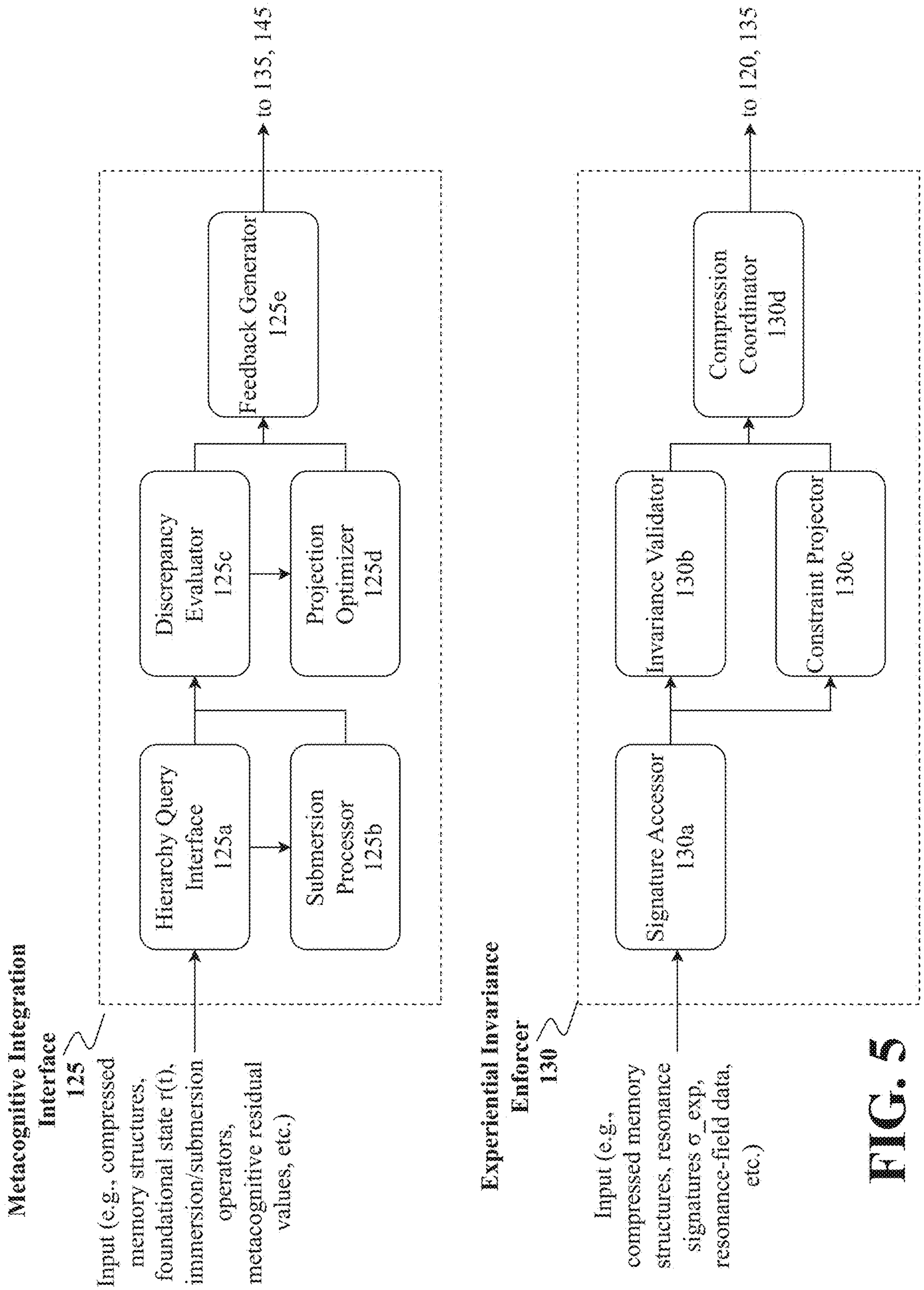
FIG. 5 illustrates an exemplary integration architecture enforcing metacognitive compatibility and experiential invariance for compressed memory structures.

FIG. 5 is a block diagram illustrating an exemplary architecture of an integration architecture within a curation and memory-compression controller, in an embodiment. The integration architecture comprises a metacognitive integration interface 125 and an experiential invariance enforcer 130, each configured to receive compressed memory structures from a compression flow engine 120 and to validate those structures against constraints derived from external cognitive and experiential systems. A metacognitive integration interface 125 is configured to enforce compatibility between compressed memory structures and identity-level information maintained in a cognitive manifold hierarchy 145, implementing the compatibility projection Π_meta and the feedback operator Ω_meta. An experiential invariance enforcer 130 is configured to verify that compression operations preserve experiential meaning encoded in resonance signatures, applying invariance validation and resonance-consistent projection based on the experiential operator Θ_exp. Structures that satisfy both compatibility and invariance constraints converge at a memory reintegration processor 135 for return to persistent memory storage.

A metacognitive integration interface 125 comprises five internal components that together implement bidirectional coupling with the cognitive manifold hierarchy 145. A hierarchy query interface **125*a* is configured to query the foundational state r(t) associated with manifold $M_3$ of the cognitive manifold hierarchy 145, as well as immersion operators, submersion operators, and a metacognitive residual, and to supply these values to downstream components within interface 125. A submersion processor 125*b* is configured to apply the cognitive submersion operators to candidate memory structures, producing transformed representations suitable for comparison against identity-level constraints encoded on manifold $M_3$ of hierarchy 145. A discrepancy evaluator 125*c* is configured to receive foundational-state data from the hierarchy query interface 125*a* and transformed structures from the submersion processor 125*b***, and to compute a geometric deviation measure quantifying discrepancy from constraints associated with the foundational manifold $M_3$.

A projection optimizer **125*d* is configured to receive deviation values from the discrepancy evaluator 125*c* and to compute a compatibility projection corresponding to Π_meta, identifying a configuration that minimizes discrepancy with identity-level constraints under the metric structure of manifold $M_3$ of the cognitive manifold hierarchy 145. The projection optimizer 125*d* outputs compatible memory structures to the memory reintegration processor 135. A feedback generator 125*e* is configured to receive the metacognitive residual from the hierarchy query interface 125*a* and projection data from the projection optimizer 125*d*, and to compute a feedback signal implementing Ω_meta, which propagates compression-induced adjustments to manifold $M_3$ of the cognitive manifold hierarchy 145**. This upward influence enables compression dynamics to inform long-term evolution of identity-level representations encoded on the foundational manifold.

An experiential invariance enforcer 130 comprises four internal components that together verify preservation of experiential meaning during compression. A signature accessor **130*a* is configured to query resonance signatures and associated resonance-field data from an experiential manifold 150, supplying these values to downstream components. An invariance validator 130*b* is configured to receive resonance signatures before and after compression and to determine whether the invariance condition σ_exp (T_after)=σ_exp(T_before) is satisfied. When the invariance condition is satisfied, the invariance validator 130*b* outputs validated structures along a pass path to the memory reintegration processor 135**.

When the invariance condition is not satisfied, the invariance validator **130*b* routes structures along a fail path to a constraint projector 130*c*. A constraint projector 130*c* is configured to apply the resonance-consistency operator Θ_exp using resonance-field data from the signature accessor 130*a*, projecting the memory structures onto resonance-consistent submanifolds that preserve experiential identity. Corrected structures are output to the memory reintegration processor 135. A compression coordinator 130*d* is configured to receive validation status from the invariance validator 130*b* and correction information from the constraint projector 130*c*, and to generate constraint feedback signals that propagate to the compression flow engine 120**, enabling compression operations to adjust dynamically in response to experiential constraints. The integration architecture operates in a deterministic, online regime and does not introduce generative, stochastic, or counterfactual modifications to memory structures, ensuring compatibility with doctrinal boundaries between online compression and offline adaptation mechanisms.

Figure 6:
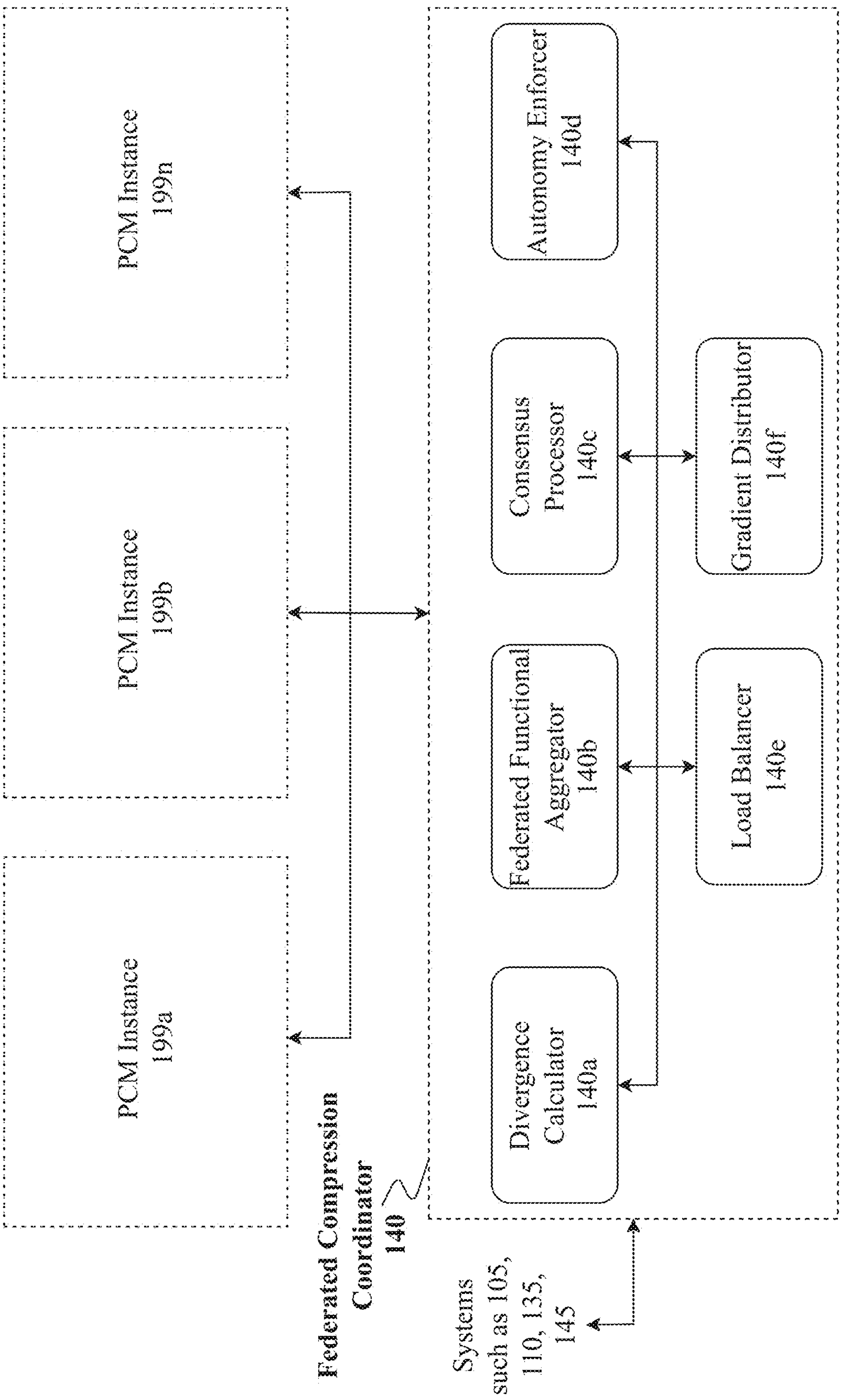
FIG. 6 illustrates an exemplary federated compression architecture coordinating memory-compression dynamics across multiple persistent cognitive machine instances.

FIG. 6 is a block diagram illustrating an exemplary architecture of a federated compression system within a curation and memory-compression controller, in an embodiment. The federated compression architecture comprises a plurality of persistent cognitive machine (PCM) instances 199*a*, 199*b* through 199*n*, each maintaining at least a respective memory manifold and local curation apparatus, and a federated compression coordinator 140 configured to manage distributed compression across the cognitive fabric. The coordinator 140 interfaces with the federated PCM instances and with other components of the curation and memory-compression controller, including a curation functional evaluator 110, a memory reintegration processor 135, and a cognitive manifold hierarchy 145. Each PCM instance executes local curation dynamics implementing Φ_comp while participating in fabric-level coordination that reduces geometric divergence between memory manifolds across the product manifold M_fabric=Π_i M_cur^(i) while preserving per-instance autonomy and identity-level distinctions.

In an embodiment, a PCM instance may include a memory manifold that encodes memory structures as geometric objects under a respective metric tensor, a curation loop controller configured to orchestrate local compression operations, a local curation functional that may compute per-instance curation scores according to Q(T), and foundational state information such as autonomy-envelope thresholds associated with manifold $M_3$ of the cognitive manifold hierarchy 145. In various embodiments, data provided from a PCM instance to the federated compression coordinator 140 may include, for example, local curation scores, metric-tensor descriptors, and optionally memory-density summaries used for fabric-level load balancing. Return data flows from the coordinator 140 to a PCM instance may include, for example, divergence values, consensus-adjustment signals, and gradient-flow instructions that modify local compression dynamics in response to fabric-wide coordination based on the federated functional Q_fed.

A federated compression coordinator 140 comprises six internal components that together implement distributed compression coordination. A divergence calculator 140*a* is configured to receive metric descriptors from the PCM instances and to compute cross-agent memory divergence values quantifying geometric incompatibility between pairs of memory manifolds. The divergence calculator 140*a* outputs divergence values Δ(T) to a curation functional evaluator 110, where they are incorporated into the divergence term of the curation functional for each PCM instance and into the global divergence component of the federated functional Q_fed.

A federated functional aggregator 140*b* is configured to receive local curation scores from the PCM instances and divergence values from the divergence calculator 140*a*, and to compute the federated curation functional Q_fed that couples local terms Q(T) with weighted divergence penalties D_cur^(i,j). This variational quantity defines the descent landscape for fabric-wide compression dynamics. A consensus processor 140*c* is configured to receive Q_fed from the aggregator 140*b* and to compute consensus adjustments that determine how local gradient flows should evolve to reduce cross-agent divergence while respecting local curation tendencies. These adjustments correspond to descent directions associated with ∇_T Q_fed and influence each PCM instance's implementation of Φ_comp.

An autonomy enforcer 140*d* is configured to query foundational divergence values from the cognitive manifold hierarchy 145 to determine whether cross-agent blending operations are permissible under autonomy envelope thresholds assigned to each PCM instance. When foundational divergence between two instances exceeds the autonomy threshold, the autonomy enforcer 140*d* signals the consensus processor 140*c* to restrict memory blending and limit compression to local manifold updates, thereby preserving identity-level distinctions encoded on manifold $M_3$ of hierarchy 145.

A load balancer 140*e* is configured to receive memory-density information associated with the federated functional aggregator 140*b* and to compute redistribution flows that prevent accumulation of excessive memory density or curvature concentration on any single instance. These redistribution flows may be derived from the density-evolution expression ∂ρ/∂t involving projection operators linking memory manifolds across the fabric. A gradient distributor 140*f* is configured to receive consensus-adjusted descent targets from the consensus processor 140*c* and to distribute gradient-flow instructions to each PCM instance, enabling coordinated evolution of memory structures across the cognitive fabric in accordance with ∇_T Q_fed. The gradient distributor 140*f* also outputs consensus-adjusted memory structures to a memory reintegration processor 135 for return to persistent storage within each PCM instance.

The federated compression architecture operates in a deterministic, online regime and does not introduce generative, stochastic, or counterfactual transformations. Instead, the coordinator 140 enforces geometric consistency, stability, and autonomy constraints across the product manifold while allowing each PCM instance to maintain distinct identity-level characteristics governed by the cognitive manifold hierarchy 145.

Figure 7:
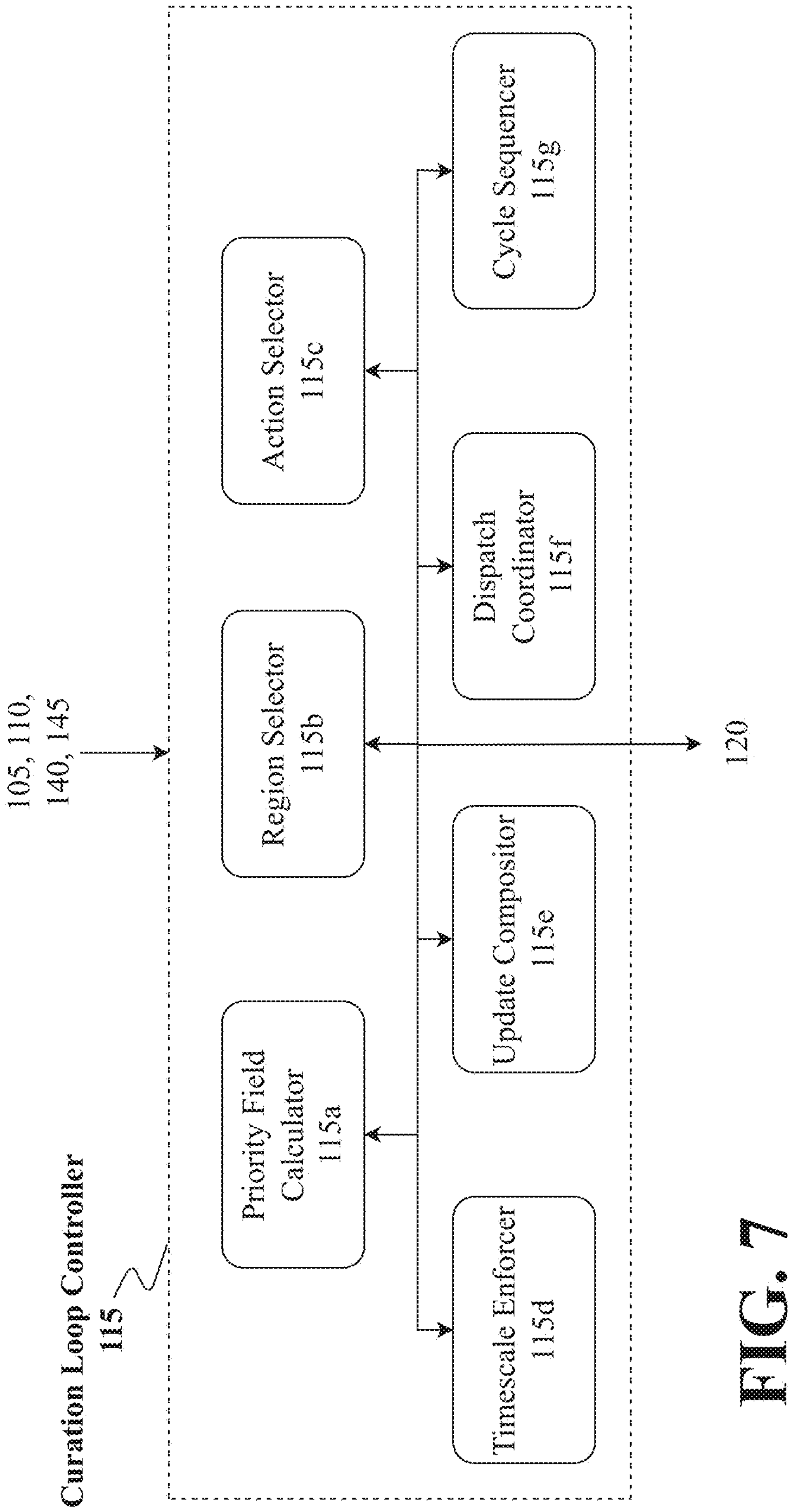
FIG. 7 illustrates an exemplary curation loop controller orchestrating priority selection, action determination, and composite-operator execution in continuous curation cycles.

FIG. 7 is a block diagram illustrating an exemplary architecture of a curation loop controller within a curation and memory-compression controller, in an embodiment. A curation loop controller 115 is configured to orchestrate the continuous online curation cycle by receiving curation scores and curvature data, prioritizing memory regions for compression, selecting appropriate curation actions, enforcing timescale constraints, assembling the composite update operator Γ_cur, and coordinating dispatch to a compression flow engine 120. The controller 115 receives curation scores Q(T) from a curation functional evaluator 110, curvature values from a memory manifold 105, and timescale parameters from a cognitive manifold hierarchy 145. In an embodiment, the controller 115 operates deterministically and does not introduce generative, stochastic, or counterfactual transformations, maintaining doctrinal separation between online compression and offline adaptation mechanisms.

A priority field calculator 115*a* is configured to receive curation scores from the curation functional evaluator 110 and curvature magnitudes from the memory manifold 105, and to compute a priority field that combines these values according to an expression such as Ψ(x)=Q(x)+γ|Ric(x)|. The resulting field highlights regions exhibiting elevated curation scores, high curvature, or both, enabling the controller 115 to focus compression activity on memory regions exerting disproportionate geometric or semantic pressure.

A region selector 115*b* is configured to receive the priority field from the priority field calculator 115*a* and to identify a target region by selecting a subset T* of the memory manifold that maximizes an integral of the priority field over candidate regions. This variational selection process identifies the portion of memory to be acted upon during the current curation cycle. An action selector 115*c* is configured to receive the selected region T* from the region selector 115*b* and to determine a curation action by minimizing a functional F(T*, A) that captures expected improvements in geometric coherence, reductions in variance, or decreases in the curation score. The action space may include contraction, merging, refactoring, dimensional reduction, pruning, or other geometric transformations consistent with the system's compression flows.

A timescale enforcer 115*d* is configured to receive timescale parameters from the cognitive manifold hierarchy 145 and to gate curation activity so that compression operates at an intermediate timescale satisfying $\Delta t_1 \ll \Delta t\_cur \ll \Delta t_3$, where $\Delta t_1$ corresponds to event-level cognitive processing and $\Delta t_3$ corresponds to foundational identity evolution on manifold $M_3$ of hierarchy 145. This separation prevents the curation process from interfering with immediate perceptual dynamics while avoiding premature alteration of long-term identity characteristics.

An update compositor 115*e* is configured to receive the selected action from the action selector 115*c* and timing constraints from the timescale enforcer 115*d*, and to assemble a composite update operator Γ_cur. In an embodiment, Γ_cur composes gradient evaluation, compression flow, dimensionality-reducing projection, and compatibility projection operations, such as ∇T Q(T), Φ_comp, π_{i→j}, and Π_meta, into a single memory transformation consistent with the system's variational and geometric framework. A dispatch coordinator 115*f* is configured to receive the selected region from the region selector 115*b* and the composite operator from the update compositor 115*e*, and to coordinate handoff to the compression flow engine 120 by transmitting target memory structures, the selected action, and the update operator.

A cycle sequencer 115*g* is configured to receive completion signals from the compression flow engine 120 and to manage the continuous curation cycle by triggering successive iterations of priority computation, region selection, action selection, update composition, and dispatch. The cycle sequencer 115*g* maps memory configurations at time t to updated configurations at time t+Δt through repeated application of the composite update operator Γ_cur, enabling continuous refinement of memory structures throughout system operation.

Figure 8:
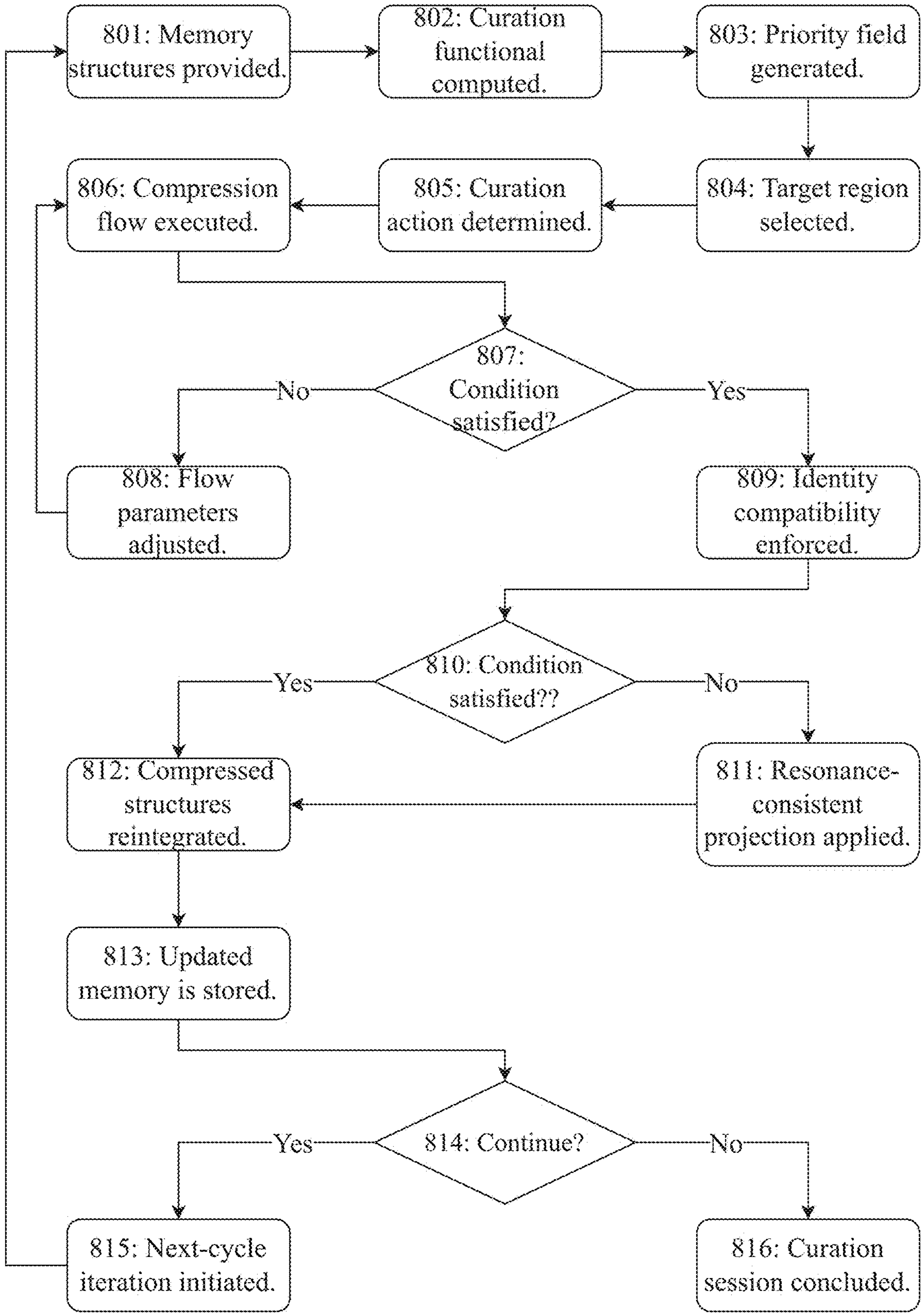
FIG. 8 illustrates an exemplary curation loop depicting the sequence through which memory structures are evaluated, prioritized, compressed, validated, and reintegrated.

FIG. 8 is a flow diagram illustrating an exemplary curation loop of a curation and memory-compression controller 100, in an embodiment. The curation loop represents a continuous online cycle through which memory structures are evaluated, prioritized, transformed, validated, and reintegrated into persistent storage. This cycle implements the composite update operator Γ_cur and operates at an intermediate timescale satisfying $\Delta t_1 \ll \Delta t\_cur \ll \Delta t_3$, enabling continuous refinement of memory geometry without disrupting fast cognitive processes or prematurely altering foundational identity characteristics.

The curation loop begins when a memory manifold 105 supplies memory structures T at a current time t to downstream processing components for evaluation and potential compression 801. A curation functional evaluator 110 receives the memory structures and computes a curation functional Q for each structure by aggregating component measures including semantic utility, curvature complexity, energy load, recurrence behavior, and cross-node divergence 802. A priority field calculator 115*a* within a curation loop controller 115 receives the curation scores from the curation functional evaluator 110 together with curvature magnitudes obtained from the memory manifold 105, and computes a priority field Ψ by combining these values according to an expression such as Ψ(x)=Q(x)+γ|Ric(x)| 803. A region selector 115*b* within the curation loop controller 115 identifies a target region T* by selecting a subset of the memory manifold that maximizes an integral of the priority field over a set of system-generated candidate regions 804.

An action selector 115*c* within the curation loop controller 115 evaluates the selected region T* against a set of permissible geometric transformations and identifies a curation action that minimizes a functional F representing expected improvements in geometric coherence, reductions in semantic variance, or decreases in the curation functional 805. A compression flow engine 120 receives the selected region and selected action from the curation loop controller 115 and executes the designated compression flow Φ_comp, which may include gradient-based compression, entropy-minimizing bundle dynamics, curvature-regulated adjustment, compression submersion, or metric evolution depending on the action selected 806.

A stability validator 435 within the compression flow engine 120 computes the instantaneous change in the curation functional and verifies whether the applied compression dynamics satisfy a stability condition requiring that dQ/dt≤0 807. When the stability condition is not satisfied, the compression flow engine 120 adjusts one or more deterministic flow parameters—such as step size or regularization magnitude—within predefined bounds and repeats the compression step with the modified parameters 808. When the stability condition is satisfied, a metacognitive integration interface 125 receives the compressed structures and applies a compatibility projection Π_meta that adjusts the structures to remain consistent with identity-level constraints derived from a foundational manifold $M_3$ within a cognitive manifold hierarchy 145 809.

An invariance validator 130*b* within an experiential invariance enforcer 130 receives the compressed structures and evaluates whether experiential resonance signatures have been preserved through the compression operation by testing an invariance condition such as σ_exp(T_after)=σ_exp(T_before) 810. When the invariance condition is not satisfied, a constraint projector 130*c* within the experiential invariance enforcer 130 applies a resonance-consistency operator Θ_exp to project the compressed structures onto resonance-consistent submanifolds, restoring experiential meaning that would otherwise be altered by compression 811. A memory reintegration processor 135 receives structures that satisfy both metacognitive compatibility and experiential invariance, and applies a reintegration operator $\mathfrak{R}$ that computes valid manifold coordinates for the compressed structures by minimizing geometric distance under the memory-manifold metric 812. The memory reintegration processor 135 updates the memory manifold 105 with the reintegrated structures and supplies resulting memory to a thought cache 160 for persistent storage and future retrieval 813.

A cycle sequencer 115*g* within the curation loop controller 115 receives completion signals from the memory reintegration processor 135 and determines whether the curation cycle should continue based on predefined operational thresholds or scheduling criteria 814. When the curation cycle continues, the curation loop controller 115 advances the temporal index to T(t+Δt_cur) and initiates the next iteration of the curation loop beginning with updated memory structures supplied from the memory manifold 105 815. When the curation cycle terminates, the curation loop controller 115 concludes the curation session and the system exits the curation loop until a subsequent session is initiated 816.

Figure 9:
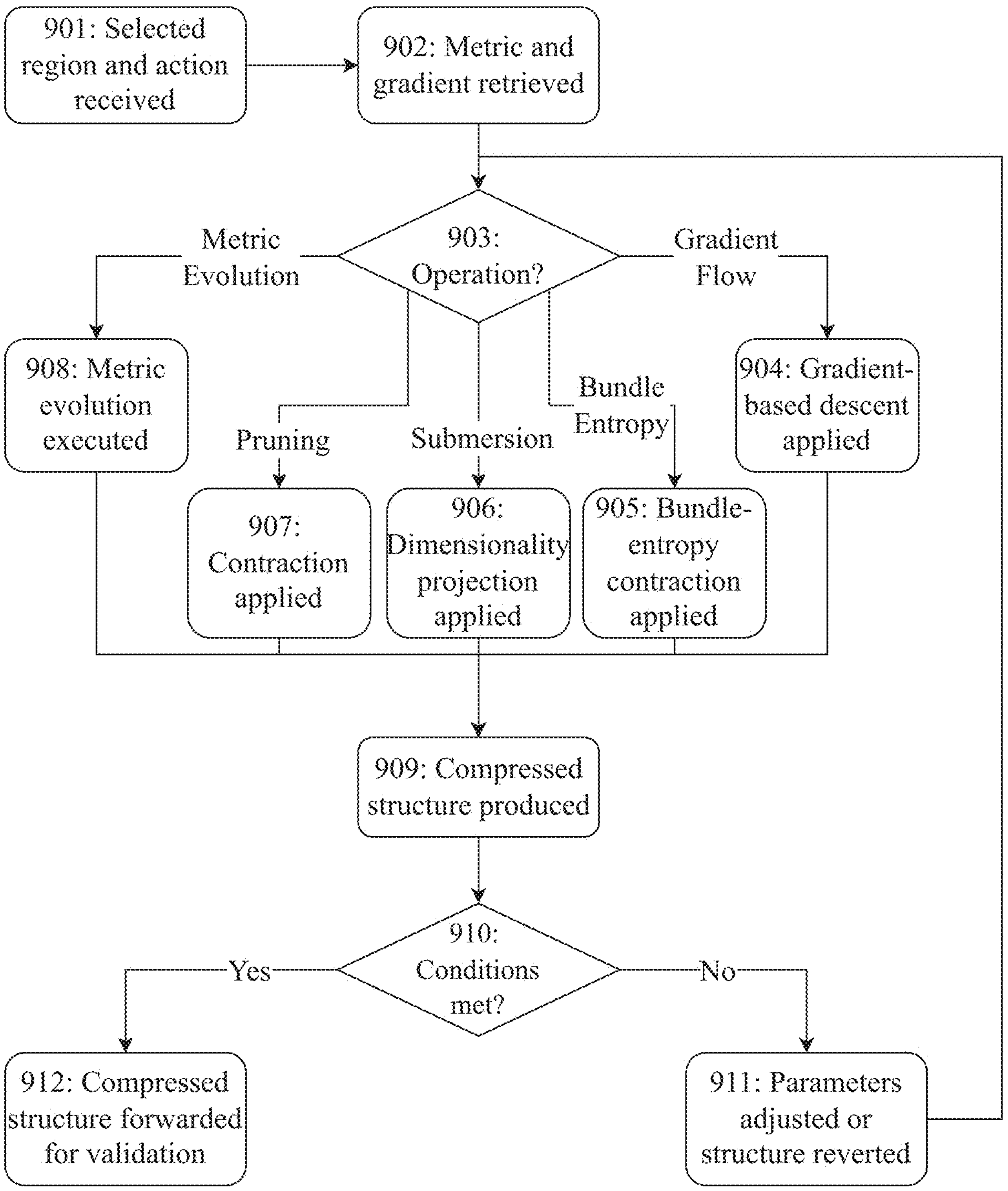
FIG. 9 illustrates an exemplary compression-operation execution process implementing designated compression mechanisms subject to stability and fidelity constraints.

FIG. 9 is a flow diagram illustrating an exemplary compression operation execution within a compression flow engine 120, in an embodiment. The compression operation execution represents the process through which a selected memory region undergoes geometric transformation according to one of five compression mechanisms, subject to stability and fidelity verification. This process implements the $\Phi\_comp$ component of the composite update operator $\Gamma\_cur$ and operates deterministically without introducing stochastic perturbations, counterfactual generation, or exploratory trajectory creation.

The compression operation execution begins when a compression flow engine 120 receives a selected memory region $T^*$ and a designated curation action $A\_cur$ from a curation loop controller 115 901. An operation selector 405 within the compression flow engine 120 retrieves the metric tensor $g\_cur$ from a memory manifold 105 and retrieves a curation gradient $\nabla Q$ from a curation functional evaluator 110, supplying the geometric and variational data required for the designated compression operation 902. The operation selector 405 evaluates the action type encoded in $A\_cur$ and routes the selected memory region to one of the five compression mechanisms implemented within the compression flow engine 120 903.

When the action type specifies gradient-based compression, a gradient flow processor 410 executes a Riemannian gradient flow expressed as $dT/dt=-\nabla\_T\ Q(T)$, advancing the memory structure along a descent direction that decreases the curation functional with respect to the metric geometry of the memory manifold 904. When the action type specifies bundle entropy compression, a bundle entropy compressor 415 executes an entropy-minimizing flow expressed as $dB/dt=-\nabla B\ S\_bundle$, contracting high-entropy experiential bundles into more coherent geometric forms subject to curvature and fidelity constraints 905. When the action type specifies dimensionality reduction, a compression submersion processor 425 applies a projection operator $\pi\{i\rightarrow j\}(x)$ that maps memory structures to a manifold of reduced dimension while preserving curvature alignment and semantic structure 906. When the action type specifies curvature-regulated pruning, a curvature-regulated adjustment processor 420 applies a continuous contraction dynamic expressed as $dT/dt=-\chi(\kappa-\kappa\_max)$, reducing geometric distortion in memory regions whose curvature exceeds a designated stability threshold 907. When the action type specifies metric evolution, a metric evolution processor 430 applies an update rule expressed as $\partial g/\partial t=F(g, Q, \nabla Q, usage)$, modifying the metric tensor of the memory manifold to reduce curvature concentration or geometric complexity in regions influenced by compression activity 908.

Upon completion of the designated compression operation, the compression flow engine 120 generates a transformed memory structure $T\_compressed$ representing the result of the applied compression mechanism 909. A stability validator 435 within the compression flow engine 120 evaluates whether the compressed structure satisfies stability and fidelity conditions, including a Lyapunov condition requiring monotonic non-increase of the curation functional, a bounded-curvature condition ensuring geometric quantities remain finite during the transformation, and a semantic fidelity condition requiring that the compressed structure remain within a system-defined distance threshold of the original structure under the memory-manifold metric 910. When any of these conditions are not satisfied, the compression flow engine 120 adjusts deterministic flow parameters—such as step size or regularization magnitude—within predefined operational limits and re-executes the selected compression mechanism; if system-defined retry constraints are exceeded, the engine may revert to the original structure $T^*$ 911. When the stability and fidelity conditions are satisfied, the compression flow engine 120 outputs the compressed structure to a metacognitive integration interface 125 and an experiential invariance enforcer 130 for subsequent compatibility and invariance validation prior to reintegration into persistent memory 912.

Figure 10:
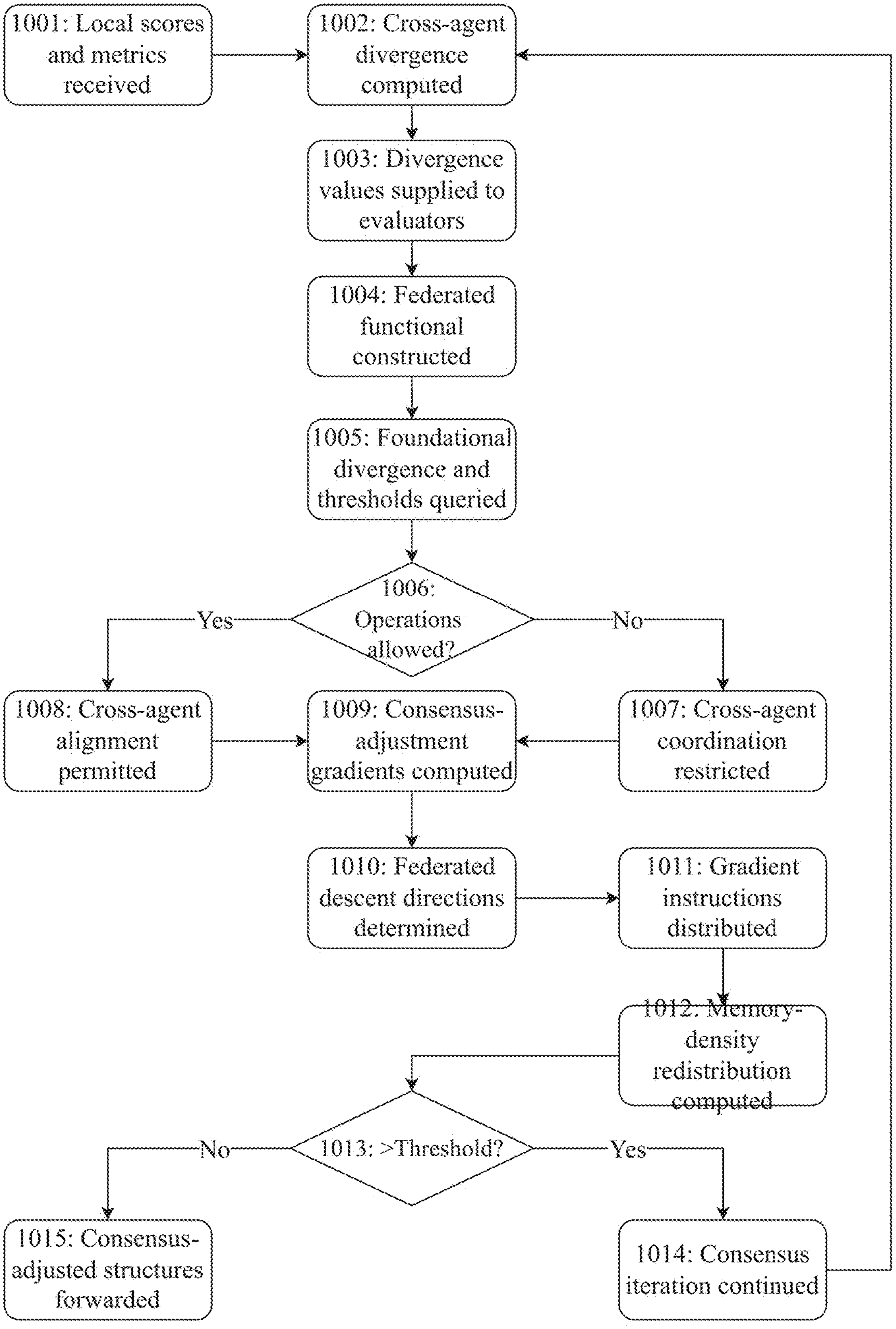
FIG. 10 illustrates an exemplary federated consensus process coordinating cross-agent geometric alignment and divergence-reduction across a cognitive fabric.

FIG. 10 is a flow diagram illustrating an exemplary federated consensus process within a federated compression coordinator 140, in an embodiment. The federated consensus process represents the distributed coordination mechanism through which multiple persistent cognitive machine instances align their memory-compression activities while preserving per-instance autonomy and identity-level distinctions. This process implements the fabric-level compression dynamics governed by the federated functional $Q\_fed$ and operates on the product manifold $M\_fabric$ comprising the memory manifolds of all participating instances.

The federated consensus process begins when a federated compression coordinator 140 receives local curation scores $Q(T\hat{}i)$ and metric-tensor descriptors from a plurality of persistent cognitive machine instances 199*a*, 199*b* through 199*n* participating in a cognitive fabric 1001. A divergence calculator 140*a* within the federated compression coordinator 140 computes cross-agent memory-divergence values $D\_cur\hat{}\{i,j\}$ for each instance pair by evaluating geometric incompatibility between their respective memory manifolds under diffeomorphic transformation 1002. The divergence calculator 140*a* outputs the computed divergence values $D\_cur\hat{}\{i,j\}$ to curation functional evaluators 110 associated with each persistent cognitive machine instance, enabling incorporation of cross-agent divergence into local curation scores 1003. A federated functional aggregator 140*b* within the federated compression coordinator 140 receives the local curation scores and divergence values and computes a federated curation functional $Q\_fed$ that couples local terms $Q(T\hat{}i)$ with weighted divergence penalties according to an expression such as $Q\_fed=\Sigma\ Q(T\hat{}i)+\Sigma\ \lambda\_\{ij\}D\_cur\hat{}\{i,j\}$ 1004.

The federated compression coordinator 140 queries foundational-divergence values $D\_found\hat{}\{i,j\}$ and autonomy thresholds $\varepsilon_3$ from a cognitive manifold hierarchy 145, obtaining the identity-level constraints that govern permissible cross-agent coordination 1005. An autonomy enforcer 140*d* within the federated compression coordinator 140 evaluates each foundational-divergence value against its corresponding autonomy threshold to determine whether cross-agent geometric coordination is permitted 1006. When foundational divergence for an instance pair equals or exceeds the autonomy threshold, the autonomy enforcer 140*d* signals that memory-compression activity for that pair must remain agent-local, preventing any geometric alignment operation that would reduce identity-level distinctions encoded on the foundational manifold $M_3$ 1007. When foundational divergence for an instance pair falls below the autonomy threshold, the autonomy enforcer 140*d* permits cross-agent geometric-alignment operations that adjust memory structures across instance boundaries without altering identity-level characteristics 1008.

A consensus processor 140*c* within the federated compression coordinator 140 computes consensus-adjustment values $\Lambda\_\{ij\}$ for each instance pair by evaluating a gradient of the cross-agent divergence with respect to local memory structures, expressed as $\Lambda\_\{ij\}=-\nabla\{T\hat{}i\}\ D\_cur\hat{}\{i,j\}$ 1009. The consensus processor 140*c* computes a distributed gradient flow for each instance based on the federated functional, expressed as $dT\hat{}i/dt=-\nabla\{T\hat{}i\}Q\_fed$, determining how each local memory manifold should evolve to reduce both local curation scores and cross-agent divergence under system-defined coordination constraints 1010. A gradient distributor 140*f* within the federated compression coordinator 140 transmits the computed gradient-flow instructions to each persistent cognitive machine instance, enabling coordinated evolution of memory structures throughout the cognitive fabric 1011. A load balancer 140*e* within the federated compression coordinator 140 computes memory-density redistribution flows according to an expression such as $\partial\rho^i/\partial t=-\nabla\cdot(\rho^i V^i)+\Sigma_{j\neq i}\kappa_{ij}[\rho^j\circ P_{j\rightarrow i}-\rho^i]$, preventing accumulation of excessive memory density or curvature concentration on any single instance 1012.

The federated compression coordinator 140 evaluates fabric-level convergence by comparing current cross-agent divergence values against a system-defined target threshold representing acceptable geometric alignment across the cognitive fabric 1013. When divergence remains above the convergence threshold, the federated compression coordinator 140 continues consensus iterations by returning to divergence computation with updated memory structures from the participating instances 1014. When divergence falls within the target threshold, the federated compression coordinator 140 outputs consensus-adjusted memory structures to memory reintegration processors 135 associated with each persistent cognitive machine instance for return to persistent storage 1015.

Exemplary Computing Environment

Figure 11:
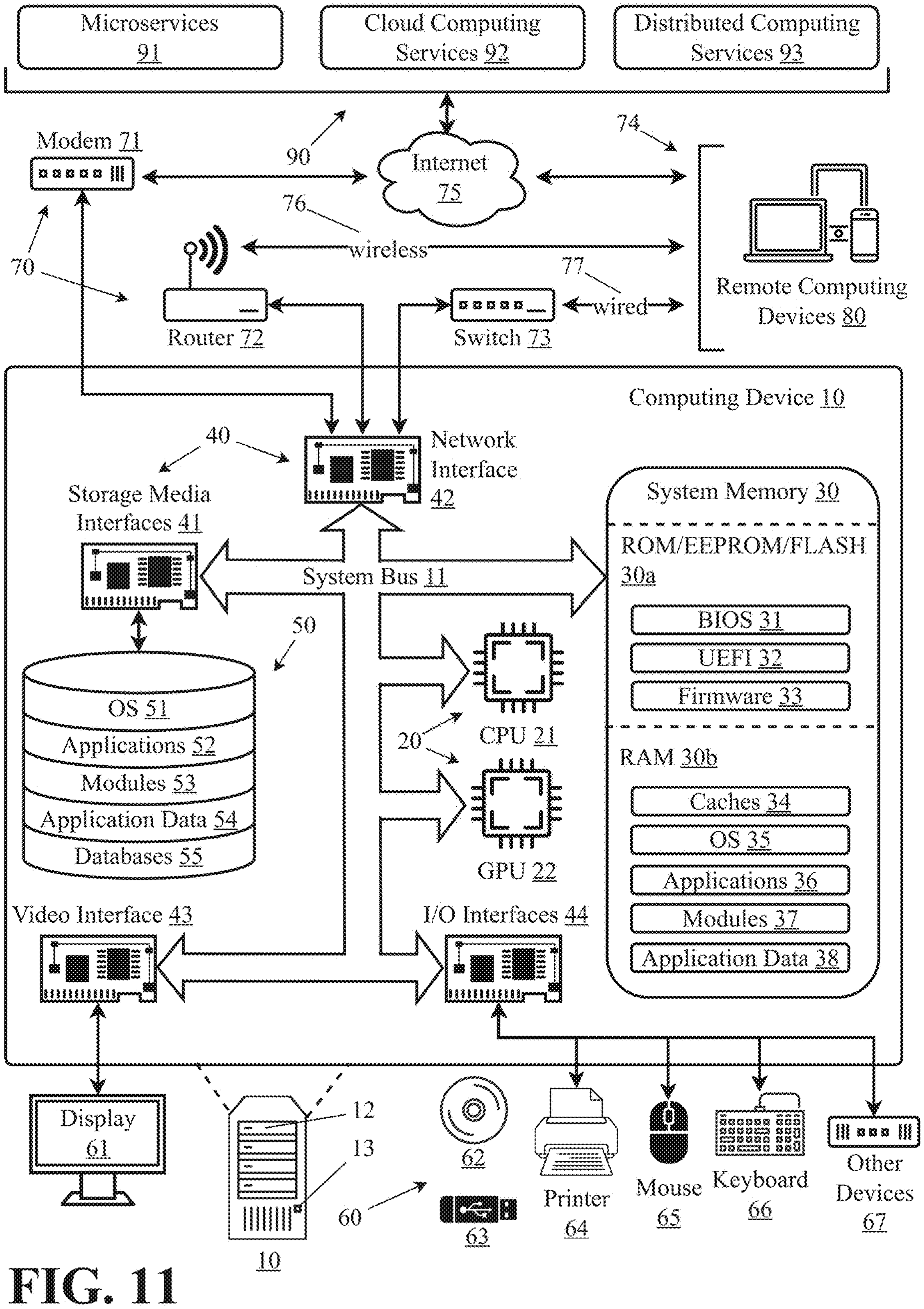
FIG. 11 illustrates an exemplary computing environment on which an embodiment described herein may be implemented.

FIG. 11 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10*to* communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that:
- maintain a memory manifold encoded in the hardware memory, the memory manifold representing memory structures as geometric objects and comprising a metric defining geometric relationships among the memory structures;
- evaluate the memory structures by computing a curation functional comprising a plurality of measures including a semantic utility measure, a curvature complexity measure derived from the metric, and at least one additional measure selected from an energy load measure, a recurrence measure, or a divergence measure;
- execute a compression flow that transforms the memory structures based on a gradient of the curation functional computed with respect to the metric, the compression flow operating to reduce the curation functional while preserving semantic or experiential fidelity of the memory structures;
- apply at least one additional compression operation selected from an entropy-minimizing bundle operation, a curvature-regulated pruning operation, a dimensionality-reducing projection between manifolds of differing dimension, or a metric-evolution operation that modifies the metric based on usage;
- enforce compatibility constraints between compressed memory structures and identity information maintained in a cognitive manifold hierarchy; and
- reintegrate compressed memory structures into the hardware memory for retrieval during subsequent cognitive processing.

2. The computer system of claim 1, wherein the compression flow operates at an intermediate timescale that is slower than event-level cognitive processing on a fast manifold of the cognitive manifold hierarchy and faster than identity-level evolution on a foundational manifold of the cognitive manifold hierarchy.

3. The computer system of claim 1, wherein the compression flow maintains a stability condition such that the curation functional decreases monotonically during compression.

4. The computer system of claim 1, wherein the software instructions further generate a feedback signal derived from the compressed memory structures, the feedback signal propagating to a foundational manifold of the cognitive manifold hierarchy to influence evolution of identity information maintained therein.

5. The computer system of claim 1, wherein enforcing compatibility constraints comprises preserving experiential resonance signatures associated with the memory structures such that compression does not alter experiential meaning encoded in the memory structures.

6. The computer system of claim 1, wherein the software instructions further prioritize memory structures for compression based on a priority measure combining the curation functional with a curvature magnitude derived from the metric.

7. The computer system of claim 1, wherein the computer system comprises a plurality of processing nodes each maintaining a respective memory manifold, and wherein the software instructions further compute a cross-node divergence measure quantifying geometric incompatibility between memory manifolds of different processing nodes.

8. The computer system of claim 7, wherein the software instructions further execute a consensus operation that adjusts the compression flow on each processing node to reduce the cross-node divergence measure while respecting autonomy constraints that prevent compression from eliminating identity-level distinctions between processing nodes.

9. The computer system of claim 1, wherein the compression flow operates continuously during online cognitive processing and excludes stochastic perturbation operations, counterfactual generation operations, and exploratory trajectory generation operations.

10. A computer-implemented method comprising:

maintaining, in a hardware memory, a memory manifold representing memory structures as geometric objects, the memory manifold comprising a metric defining geometric relationships among the memory structures;

evaluating the memory structures by computing a curation functional comprising a plurality of measures including a semantic utility measure, a curvature complexity measure derived from the metric, and at least one additional measure selected from an energy load measure, a recurrence measure, or a divergence measure;

executing a compression flow that transforms the memory structures based on a gradient of the curation functional computed with respect to the metric, the compression flow operating to reduce the curation functional while preserving semantic or experiential fidelity of the memory structures;

applying at least one additional compression operation selected from an entropy-minimizing bundle operation, a curvature-regulated pruning operation, a dimensionality-reducing projection between manifolds of differing dimension, or a metric-evolution operation that modifies the metric based on usage;

enforcing compatibility constraints between compressed memory structures and identity information maintained in a cognitive manifold hierarchy; and reintegrating compressed memory structures into the hardware memory for retrieval during subsequent cognitive processing.

11. The method of claim 10, wherein the compression flow operates at an intermediate timescale that is slower than event-level cognitive processing on a fast manifold of the cognitive manifold hierarchy and faster than identity-level evolution on a foundational manifold of the cognitive manifold hierarchy.

12. The method of claim 10, wherein the compression flow maintains a stability condition such that the curation functional decreases monotonically during compression.

13. The method of claim 10, further comprising generating a feedback signal derived from the compressed memory structures, the feedback signal propagating to a foundational manifold of the cognitive manifold hierarchy to influence evolution of identity information maintained therein.

14. The method of claim 10, wherein enforcing compatibility constraints comprises preserving experiential resonance signatures associated with the memory structures such that compression does not alter experiential meaning encoded in the memory structures.

15. The method of claim 10, further comprising prioritizing memory structures for compression based on a priority measure combining the curation functional with a curvature magnitude derived from the metric.

16. The method of claim 10, further comprising computing a cross-node divergence measure quantifying geometric incompatibility between memory manifolds maintained on a plurality of processing nodes.

17. The method of claim 16, further comprising executing a consensus operation that adjusts the compression flow on each processing node to reduce the cross-node divergence measure while respecting autonomy constraints that prevent compression from eliminating identity-level distinctions between processing nodes.

18. The method of claim 10, wherein the compression flow operates continuously during online cognitive processing and excludes stochastic perturbation operations, counterfactual generation operations, and exploratory trajectory generation operations.

19. A nontransitory computer-readable medium storing instructions that, when executed by a processor coupled to a hardware memory, cause the processor to:

maintain a memory manifold encoded in the hardware memory, the memory manifold representing memory structures as geometric objects and comprising a metric defining geometric relationships among the memory structures;

evaluate the memory structures by computing a curation functional comprising a plurality of measures including a semantic utility measure, a curvature complexity measure derived from the metric, and at least one additional measure selected from an energy load measure, a recurrence measure, or a divergence measure;

execute a compression flow that transforms the memory structures based on a gradient of the curation functional computed with respect to the metric, the compression flow operating to reduce the curation functional while preserving semantic or experiential fidelity of the memory structures;

apply at least one additional compression operation selected from an entropy-minimizing bundle operation, a curvature-regulated pruning operation, a dimensionality-reducing projection between manifolds of differing dimension, or a metric-evolution operation that modifies the metric based on usage;

enforce compatibility constraints between compressed memory structures and identity information maintained in a cognitive manifold hierarchy; and reintegrate compressed memory structures into the hardware memory for retrieval during subsequent cognitive processing.

20. The nontransitory computer-readable medium of claim 19, wherein the compression flow operates at an intermediate timescale that is slower than event-level cognitive processing on a fast manifold of the cognitive manifold hierarchy and faster than identity-level evolution on a foundational manifold of the cognitive manifold hierarchy.

21. The nontransitory computer-readable medium of claim 19, wherein the compression flow maintains a stability condition such that the curation functional decreases monotonically during compression.

22. The nontransitory computer-readable medium of claim 19, wherein the instructions further cause the processor to generate a feedback signal derived from the compressed memory structures, the feedback signal propagating to a foundational manifold of the cognitive manifold hierarchy to influence evolution of identity information maintained therein.

23. The nontransitory computer-readable medium of claim 19, wherein enforcing compatibility constraints comprises preserving experiential resonance signatures associated with the memory structures such that compression does not alter experiential meaning encoded in the memory structures.

24. The nontransitory computer-readable medium of claim 19, wherein the instructions further cause the processor to prioritize memory structures for compression based on a priority measure combining the curation functional with a curvature magnitude derived from the metric.

25. The nontransitory computer-readable medium of claim 19, wherein the instructions further cause the processor to compute a cross-node divergence measure quantifying geometric incompatibility between memory manifolds maintained on a plurality of processing nodes.

26. The nontransitory computer-readable medium of claim 25, wherein the instructions further cause the processor to execute a consensus operation that adjusts the compression flow on each processing node to reduce the cross-node divergence measure while respecting autonomy constraints that prevent compression from eliminating identity-level distinctions between processing nodes.

27. The nontransitory computer-readable medium of claim 19, wherein the compression flow operates continuously during online cognitive processing and excludes stochastic perturbation operations, counterfactual generation operations, and exploratory trajectory generation operations.

* * * * *